US012766516B2

(12) United States Patent
Buckland et al.

(10) Patent No.: US 12,766,516 B2
(45) Date of Patent: Oct. 20, 2026

(54) SYSTEMS AND MODULES FOR NUCLEIC ACID AMPLIFICATION TESTING

(71) Applicant: LEX DIAGNOSTICS LTD, Royston (GB)

(72) Inventors: Justin Rorke Buckland, Cambridge (GB); Alex Stokoe, Royston (GB)

(73) Assignee: Lex Diagnostics Ltd., Melbourn (GB)

( * ) Notice: Subject to any disclaimer, the term of this patent is extended or adjusted under 35 U.S.C. 154(b) by 929 days.

(21) Appl. No.: 17/630,473

(22) PCT Filed: Jul. 24, 2020

(86) PCT No.: PCT/EP2020/071049

§ 371 (c)(1), (2) Date: Jan. 26, 2022

(87) PCT Pub. No.: WO2021/018801

PCT Pub. Date: Feb. 4, 2021

(65) Prior Publication Data

US 2022/0258159 A1 Aug. 18, 2022

(30) Foreign Application Priority Data

Jul. 26, 2019 (EP) .................................... 19188514

(51) Int. Cl.

*B01L 3/00* (2006.01)
*B01L 7/00* (2006.01)

(52) U.S. Cl.

CPC ..... *B01L 3/50851* (2013.01); *B01L 3/502715* (2013.01); *B01L 7/52* (2013.01);

(Continued)

(58) Field of Classification Search

CPC .. B01L 3/50851; B01L 3/502715; B01L 7/52; B01L 2200/025; B01L 2200/10;

(Continued)

(56) References Cited

U.S. PATENT DOCUMENTS 5,210,015 A 5/1993 Gelfand et al.
5,561,058 A 10/1996 Gelfand et al.

(Continued)

FOREIGN PATENT DOCUMENTS

AU 199734812 1/1998
AU 200022334 6/2000

(Continued)

OTHER PUBLICATIONS

Barciszewski et al., "Comparative calorimetric studies on the dynamic conformation of plant 5S rRNA. I. Thermal unfolding pattern of lupin seeds and wheat germ 5S rRNAs, also in the presence of magnesium and sperminium specifications," Nucleic Acids Research, Jan. 25, 1988, 16(2):685-701.

(Continued)

*Primary Examiner* — Charles Capozzi
*Assistant Examiner* — Jacqueline Brazin
(74) *Attorney, Agent, or Firm* — Fish & Richardson P.C.

(57) ABSTRACT

Systems for nucleic acid amplification testing are provided. The systems comprise a consumable amplification module and a reader module for receiving the amplification module. The amplification module comprises: a reactor vessel for containing a test sample; a heater comprising a heater element in thermal contact with the reactor vessel and controllable to add heat to the reactor vessel so as to heat the test sample; a temperature sensor for determining the temperature of at least one of the heater element and the test sample; and a heat sink or a heat spreader in thermal contact with the heater. The reader module comprises: a heater controller for selectively controlling the heater element between an on condition and an off condition in response to the determined temperature of the heater element and/or test sample; and an electrical heater interface for connecting the heater controller and the heater. The system comprises a heat (Continued)

sink for subtracting heat from the reactor vessel so as to cool the test sample. The amplification module may comprise the heat sink. The receiver module may comprise the heat sink and a thermal interface, and the amplification module may comprise the heat spreader for thermal contact with the thermal interface.

12 Claims, 16 Drawing Sheets

(52) U.S. Cl.
CPC ..... *B01L 2200/025* (2013.01); *B01L 2200/10* (2013.01); *B01L 2200/147* (2013.01); *B01L 2300/0654* (2013.01); *B01L 2300/1827* (2013.01)

(58) Field of Classification Search
CPC ....... B01L 2200/147; B01L 2300/0654; B01L 2300/1827; B01L 2400/0487; B01L 3/0279; B01L 3/502753; B01L 2200/027; C12Q 1/686
USPC ........................................................ 435/287.2
See application file for complete search history.

(56) References Cited

U.S. PATENT DOCUMENTS

| | | | |
|---|---|---|---|
| 5,624,833 A | 4/1997 | Gelfand et al. | |
| 5,674,738 A | 10/1997 | Abramson et al. | |
| 6,020,130 A | 2/2000 | Gold et al. | |
| RE42,325 E | 5/2011 | Wittwer et al. | |
| 8,455,190 B2 | 6/2013 | Makrigiorgos | |
| 9,415,392 B2 | 8/2016 | Ismagilov et al. | |
| 11,338,296 B2 | 5/2022 | Bucklan et al. | |
| 11,369,007 B2 | 6/2022 | Coursey et al. | |
| 2002/0022261 A1 | 2/2002 | Anderson et al. | |
| 2002/0028452 A1 | 3/2002 | Wittwer et al. | |
| 2002/0032531 A1 | 3/2002 | Mansky et al. | |
| 2002/0119465 A1 | 8/2002 | Zhao et al. | |
| 2002/0142300 A1 | 10/2002 | Bernard et al. | |
| 2002/0168671 A1 | 11/2002 | Burns et al. | |
| 2003/0008286 A1 | 1/2003 | Zou et al. | |
| 2003/0017482 A1 | 1/2003 | Godfrey et al. | |
| 2003/0165867 A1 | 9/2003 | Eyre et al. | |
| 2004/0096964 A1 | 5/2004 | Mastromattteo et al. | |
| 2004/0206749 A1 | 10/2004 | Villa et al. | |
| 2004/0214315 A1 | 10/2004 | Saulz et al. | |
| 2004/0227529 A1 | 11/2004 | Brooks et al. | |
| 2005/0002835 A1 | 1/2005 | Shaw et al. | |
| 2005/0006372 A1 | 1/2005 | Murakami et al. | |
| 2005/0009101 A1 | 1/2005 | Blackburn | |
| 2005/0019902 A1 | 1/2005 | Mathies et al. | |
| 2005/0255499 A1 | 11/2005 | Gelfand et al. | |
| 2006/0110763 A1 | 5/2006 | Kopp | |
| 2006/0191887 A1 | 8/2006 | Baer et al. | |
| 2008/0003649 A1 | 1/2008 | Maltezos et al. | |
| 2008/0003650 A1 | 1/2008 | Banerji | |
| 2008/0176290 A1 | 7/2008 | Joseph et al. | |
| 2008/0248535 A1 | 10/2008 | Ankenbauer et al. | |
| 2009/0023603 A1 | 1/2009 | Selden et al. | |
| 2009/0111149 A1 | 4/2009 | Cao | |
| 2009/0269766 A1 | 10/2009 | Heindl et al. | |
| 2009/0317806 A1 | 12/2009 | Hasson | |
| 2009/0317874 A1 | 12/2009 | Dale et al. | |
| 2010/0086991 A1 | 4/2010 | Fish | |
| 2010/0104485 A1 | 4/2010 | Yuan | |
| 2010/0191482 A1 | 7/2010 | Hasson et al. | |
| 2010/0311070 A1 | 12/2010 | Oh et al. | |
| 2011/0014605 A1 | 1/2011 | Stone | |
| 2011/0048547 A1 | 3/2011 | Hasson et al. | |
| 2011/0077897 A1 | 3/2011 | Hasson et al. | |
| 2011/0091877 A1 | 4/2011 | Murphy et al. | |
| 2011/0312072 A1 | 12/2011 | Azimi et al. | |
| 2012/0051390 A1 | 3/2012 | Coursey et al. | |
| 2012/0052560 A1* | 3/2012 | Knight | G01N 35/1095 435/286.1 |
| 2012/0070841 A1 | 3/2012 | Abe et al. | |
| 2012/0264202 A1 | 10/2012 | Walker et al. | |
| 2013/0137591 A1 | 5/2013 | Clemens et al. | |
| 2013/0157271 A1 | 6/2013 | Coursey et al. | |
| 2013/0171630 A1 | 7/2013 | Qin | |
| 2013/0330818 A1 | 12/2013 | Koeda et al. | |
| 2014/0011266 A1* | 1/2014 | Webster | B01L 7/52 435/303.1 |
| 2014/0045191 A1 | 2/2014 | Dejohn et al. | |
| 2014/0073013 A1 | 3/2014 | Gorman et al. | |
| 2014/0199699 A1 | 7/2014 | Lee | |
| 2014/0220668 A1 | 8/2014 | Tachibana et al. | |
| 2015/0321195 A1 | 11/2015 | Malik et al. | |
| 2016/0114327 A1 | 4/2016 | Kimball et al. | |
| 2016/0195492 A1 | 7/2016 | Bauer | |
| 2016/0340632 A1 | 11/2016 | Breinlinger et al. | |
| 2016/0341605 A1 | 11/2016 | Coursey et al. | |
| 2016/0377562 A1 | 12/2016 | Sundberg et al. | |
| 2017/0239662 A1 | 8/2017 | Hwang | |
| 2017/0304829 A1 | 10/2017 | Andreyev et al. | |
| 2017/0342360 A1 | 11/2017 | Kim et al. | |
| 2018/0015476 A1 | 1/2018 | Maeda | |
| 2018/0154363 A1 | 6/2018 | Figley et al. | |
| 2018/0221882 A1 | 8/2018 | Roberts et al. | |
| 2019/0032114 A1 | 1/2019 | Trivedi et al. | |
| 2021/0276016 A1 | 9/2021 | Buckland | |
| 2022/0250080 A1 | 8/2022 | Buckland et al. | |
| 2022/0280946 A1 | 9/2022 | Buckland et al. | |

FOREIGN PATENT DOCUMENTS

| | | |
|---|---|---|
| AU | 200135165 | 10/2001 |
| AU | 2006214085 | 8/2006 |
| CA | 2922813 | 3/2015 |
| CN | 1754095 | 3/2006 |
| CN | 1800411 | 7/2006 |
| CN | 101104842 A | 1/2008 |
| CN | 101696929 | 4/2010 |
| CN | 101711257 | 5/2010 |
| CN | 101935697 | 1/2011 |
| CN | 102076869 | 5/2011 |
| CN | 108136401 A | 6/2018 |
| CN | 108883417 | 11/2018 |
| DE | 19755479 A1 | 6/1999 |
| DE | 202010013705 | 12/2010 |
| EP | 0436644 | 4/1996 |
| EP | 0506889 | 4/1997 |
| EP | 0919565 | 6/1999 |
| EP | 0972848 | 1/2000 |
| EP | 1033411 | 9/2000 |
| EP | 1059523 | 12/2000 |
| EP | 1362928 | 11/2003 |
| EP | 0906449 | 3/2004 |
| EP | 1202805 B1 | 12/2004 |
| EP | 1897612 | 3/2008 |
| EP | 1978109 | 10/2008 |
| EP | 1778877 | 10/2009 |
| EP | 2240610 | 8/2012 |
| EP | 2064346 | 11/2013 |
| EP | 2315848 | 12/2014 |
| EP | 2582839 | 5/2016 |
| EP | 2089542 | 1/2017 |
| EP | 2598653 | 8/2017 |
| EP | 1941035 | 11/2017 |
| EP | 2710859 | 9/2019 |
| EP | 2625286 | 4/2020 |
| JP | H11509094 | 8/1999 |
| JP | 2002-141163 A | 5/2002 |
| JP | 2008035859 | 2/2008 |
| JP | 2013504181 | 2/2013 |
| JP | 2013528359 | 7/2013 |
| JP | 2014030799 A | 2/2014 |
| JP | 2015-112575 A | 6/2015 |
| JP | 2017-506060 A | 3/2017 |
| KR | 1020130128724 | 11/2013 |
| WO | WO 1992002638 | 2/1992 |

(56) References Cited

FOREIGN PATENT DOCUMENTS

| | | | |
|---|---|---|---|
| WO | WO 1994008032 | 4/1994 | |
| WO | WO 1996015270 | 5/1996 | |
| WO | WO 1997011085 | 3/1997 | |
| WO | WO 1997046707 | 12/1997 | |
| WO | WO 1998004746 | 2/1998 | |
| WO | WO 2000009651 | 2/2000 | |
| WO | WO 2000012854 | 2/2000 | |
| WO | WO 2000018965 | 4/2000 | |
| WO | WO 2002014555 | 2/2002 | |
| WO | WO 2002044339 | 6/2002 | |
| WO | WO 2002070751 | 9/2002 | |
| WO | WO 2003004991 | 1/2003 | |
| WO | WO 2003006161 | 1/2003 | |
| WO | WO 2003033722 | 4/2003 | |
| WO | WO 2003091408 | 11/2003 | |
| WO | WO 2004038038 | 5/2004 | |
| WO | WO 2004065629 | 8/2004 | |
| WO | WO 2006034215 | 3/2006 | |
| WO | WO 2006089192 | 8/2006 | |
| WO | WO 2006121423 | 11/2006 | |
| WO | WO 2007035806 | 3/2007 | |
| WO | WO 2007092643 | 8/2007 | |
| WO | WO 2008005241 | 1/2008 | |
| WO | WO 2008005321 | 1/2008 | |
| WO | WO 2008061129 | 5/2008 | |
| WO | WO 2008066869 | 6/2008 | |
| WO | WO 2009032087 | 3/2009 | |
| WO | WO 2009135093 | 11/2009 | |
| WO | WO 2010033338 | 3/2010 | |
| WO | WO 2010118427 | 10/2010 | |
| WO | WO 2010118430 | 10/2010 | |
| WO | WO 2010132813 | 11/2010 | |
| WO | WO 2011106724 | 9/2011 | |
| WO | WO 2011153385 | 12/2011 | |
| WO | WO 2012045668 | 4/2012 | |
| WO | WO 2013074627 | 5/2013 | |
| WO | WO 2013101295 | 7/2013 | |
| WO | WO 2013142364 | 9/2013 | |
| WO | WO 2011124918 | 10/2013 | |
| WO | WO 2013177429 | 11/2013 | |
| WO | WO 2014058919 | 4/2014 | |
| WO | WO 2014143228 | 9/2014 | |
| WO | WO 2014152544 | 9/2014 | |
| WO | WO 2014210199 | 12/2014 | |
| WO | WO 2015058104 | 4/2015 | |
| WO | WO 2015069743 | 5/2015 | |
| WO | WO 2015073689 | 5/2015 | |
| WO | WO-2015073999 A1 * | 5/2015 | .............. B01L 3/502 |
| WO | WO 2015103320 | 7/2015 | |
| WO | WO 2015143442 A2 | 9/2015 | |
| WO | WO 2017079636 | 5/2017 | |
| WO | WO 2017119902 | 7/2017 | |
| WO | WO 2017127570 | 7/2017 | |
| WO | WO 2018023118 | 2/2018 | |
| WO | WO 2018094091 | 5/2018 | |
| WO | WO 2019046860 | 3/2019 | |
| WO | WO 2020021280 | 1/2020 | |
| WO | WO 2021018807 A1 | 2/2021 | |
| WO | WO 2012161566 | 11/2021 | |

OTHER PUBLICATIONS

Chakrabarti et al., "Thermal stability of PNA/DNA and DNA/DNA duplexes by differential, scanning calorimetry," Nucleic Acids Research, Dec. 1, 1999, 27(24):4801-4806.

Claucherty et al., "Phenol-Formaldehyde Resin for Optical-Chemical Temperature Sensing," Sensors, May 30, 2018, 18:6: 9 pages.

Extended European Search Report in European Application No. 19188514.4, mailed May 6, 2020, 25 pages.

Farrar et al., "Extreme PCR: Efficient and Specific DNA Amplification in 15-60 Seconds," Clinical Chemistry, Jan. 2015, 61(1):145-153.

Hindson, "High-Throughput Droplet Digital PCR System for Absolute Quantitation of DNA Copy Number," Anal. Chem, Nov. 15, 2011, 83(22):8604-8610.

International Preliminary Report on Patentability in Appl. No. PCT/GB2019/052100, mailed Jan. 26, 2021, 6 pages.

International Preliminary Report on Patentability in International Application No. PCT/EP2020/071049, mailed Feb. 1, 2022, 13 pages.

International Search Report and Written Opinion in Appln. No. Application PCT/GB2019/052100, mailed Nov. 7, 2019, 9 pages.

International Search Report and Written Opinion in International Application No. PCT/EP2020/071049, mailed Dec. 1, 2020, 24 pages.

Invitation to Pay Additional Fees in International Application No. PCT/EP2020/071049, mailed Oct. 9, 2020, 18 pages.

Kuliński et al., "Comparative calorimetric studies on the dynamic conformation of plant 5S rRNA: II structural interpretation of the thermal unfolding patterns for lupin seeds and wheat germ," Nucleic Acids Research, Apr. 1991, 19(9):2449-2455.

Lukacs et al., "Size-dependent DNA mobility in cytoplasm and nucleus," J Biol Chem., 2000, 275(3):1625-1629.

Marin, "Characteristic dimensions for heat transfer," Lat. Am J Phys. Educ, Jan. 16, 2010, 4(1): 6 pages.

Notice of Allowance in Chinese Appln. No. 201980063573, mailed May 27, 2022, 4 pages (English translation).

Notice of Allowance in U.S. Appl. No. 17/324,457, mailed Dec. 29, 2021, 8 pages.

Office Action in Australian Appln. No. 2019311817, mailed Jul. 21, 2022, 3 pages.

Office Action in Australian Appln. No. 2019311817, mailed Jun. 27, 2023, 2 pages.

Office Action in Chinese Appln. No. 201980063573, mailed Dec. 16, 2021, 9 pages (English translation).

Office Action in Japanese Appln. No. 2021-528006, mailed May 9, 2023, 8 pages (English translation).

Office Action in U.S. Appl. No. 17/324,457, mailed Sep. 16, 2021, 12 pages.

Partial European Search Report in European Application No. 19188514.4, dated Jan. 15, 2020, 20 pages.

Search Report in Chinese Appln. No. 201980063573, mailed Dec. 7, 2021, 5 pages (English translation).

Trauba et al., "Microfluidic extreme PCR: <1 minute DNA amplification in a thin film disposable," J Biomedical Science and Engineering, May 18, 2017, 10: 14 pages.

Office Action in Canadian Appln. 3148775, mailed Nov. 14, 2023, 5 pages.

Office Action in European Appln. No. 19188514.4, mailed Apr. 16, 2024, 5 pages.

Office Action in European Appln. No. 19758796.7, mailed Mar. 27, 2024, 4 pages.

Office Action in Japanese Appln. No. 2021-528006, mailed Apr. 26, 2024, 12 pages (with English translation).

Office Action in Japanese Appln. No. 2022-505480, mailed Sep. 3, 2024, 9 pages (English translation).

Office Action in Chinese Appln. No. 202080064458.7, mailed on Dec. 21, 2024, 46 pages (with English translation).

Office Action in U.S. Appl. No. 17/722,243, mailed Mar. 26, 2025, 10 pages.

Office Action in Chinese Appln. No. 202080064458.7, mailed on Aug. 2, 2025, 36 pages (with English translation).

International Preliminary Report on Patentability in International Appln. No. PCT/EP2020/071059, Feb. 10, 2022, 15 pages.

International Search Report and Written Opinion in International Appln. No. PCT/EP2020/071059, Oct. 12, 2020, 11 pages.

Linear Technology Corporation, "LTC6102: Precision Zero Drift Current Sense Amplifier," 2007, 26 pages.

Office Action in Canadian Appln. No. 3148777, mailed on Nov. 2, 2023, 5 pages.

Office Action in Chinese Appln. No. 202080063456.6, mailed Dec. 20, 2024, 25 pages (with English translation).

Office Action in European Appln. No. 20742785.7, mailed on Mar. 26, 2025, 20 pages.

(56) References Cited

OTHER PUBLICATIONS

Office Action in European Appln. No. 20742787.3, mailed Dec. 16, 2024, 6 pages.
Office Action in Japanese Appln. No. 2022-505479, mailed on Oct. 2, 2024, 10 pages.

* cited by examiner

SYSTEMS AND MODULES FOR NUCLEIC ACID AMPLIFICATION TESTING

CROSS-REFERENCE TO RELATED APPLICATIONS

This application is a § 371 National Stage Application of PCT/EP2020/071049, filed Jul. 24, 2020, which claims priority to European Patent Application No. 19188514.4, filed on Jul. 26, 2019, the entire contents of which are hereby incorporated by reference.

BACKGROUND OF THE INVENTION

The present invention relates to systems for nucleic acid amplification testing, and modules for said systems.

An example process where a reactor is required is DNA amplification by the polymerase chain reaction (PCR), where the reactor is suitable for fast thermocycling to reduce the time for completion of PCR. Another example is DNA sequencing by synthesis where base addition can be optimised by adjusting the temperature for each step of a multi-step reaction.

PCR requires repeated temperature cycling between temperatures of approximately 60° C. and 95° C. Conventionally, heating and cooling are carried out using an expensive Peltier element to drive heat from a heat sink into a sample when increased temperature is required, or to drive heat from the sample to a heat sink when decreased temperature is required. The heat sink is often cooled with a fan.

This approach has many disadvantages, for example as follows. The apparatus required is large, costly, and has high power consumption. The heat capacity of the part of the apparatus that changes temperature during a thermal cycle is significantly larger than the heat capacity of the sample, resulting in increased energy use and slower thermal cycling. Temperature ramp rates are limited and the thermal cycling time is increased by long thermal diffusion times through the Peltier element and parts used to make thermal contact with and contain the sample, and through the sample itself. These factors result in slow and energy-inefficient PCR thermocycling.

A conventional Peltier-based thermocycling instrument comprises a number of parts, including a layered bulk thermal block within a reader part, and a complex thermal interface. The instrument requires a thermo-electric block and a large heat sink with fins for passive or forced convection cooling.

It would be advantageous to dispose of a large amount of this material from the system, as well as to eliminate the thermo-electric (Peltier) element, since this component has a limited lifetime due to the mechanical stresses of repeated thermal cycling.

Another conventional Peltier-based thermocycling instrument comprises a reaction vessel with a system for controlling the temperature of the sample within. The reaction vessel comprises a polypropylene frame with thin heat-sealed films on either side to seal the volume while providing a thermal contact area. Thermal contact with a consumable part is provided by spring clips, as well as pneumatic pressure applied to the reaction vessel to inflate walls of the consumable part. This arrangement has advantages over conventional thermocycling, by providing closer thermal contact with low thermal mass parts, but requires complex clamping and inflation to achieve the thermal contact with the reaction mixture. The reaction volume is also appreciably thick in comparison to the thermal contact areas, and this limits the ramp rate of thermocycling as the volume at the sides will observe faster temperature changes compared to the volume in the centre.

Another conventional Peltier-based thermocycling instrument comprises heating and temperature sensing means on a thermal interface part of a reader. The temperature sensor occupies an area in the centre of the sample that could be used for heat transfer and the distance between the sensor a heater track could lead to discrepancies between measured temperature and the heater and sample temperatures.

The present invention aims to alleviate at least to some extent one or more of the problems of the prior art.

SUMMARY OF THE INVENTION

According to an aspect of the invention, there is provided a system for nucleic acid amplification testing, the system comprising a consumable amplification module and a reader module for receiving the amplification module, wherein the amplification module comprises: a reactor vessel for containing a test sample; a heater comprising a heater element in thermal contact with the reactor vessel and controllable to add heat to the reactor vessel so as to heat the test sample; a temperature sensor for determining the temperature of at least one of the heater element and the test sample; and a heat sink in thermal contact with the heater for subtracting heat from the reactor vessel so as to cool the test sample, and wherein the reader module comprises: a heater controller for selectively controlling the heater element between an on condition and an off condition in response to the determined temperature of the heater element and/or test sample; and an electrical heater interface for connecting the heater controller and the heater.

According to another aspect of the invention, there is provided a system for nucleic acid amplification testing, the system comprising a consumable amplification module and a reader module for receiving the amplification module, wherein the amplification module comprises: a reactor vessel for containing a test sample; a heater comprising a heater element in thermal contact with the reactor vessel and controllable to add heat to the reactor vessel so as to heat the test sample; a temperature sensor for determining the temperature of at least one of the heater element and the test sample; and a heat spreader in thermal contact with the heater, and wherein the reader module comprises: a heater controller for selectively controlling the heater element between an on condition and an off condition in response to the determined temperature of the heater element and/or test sample; an electrical heater interface for connecting the heater controller and the heater; a heat sink; and a thermal interface in thermal contact with the heat sink, the thermal interface being adapted for thermal contact with the heat spreader when the amplification module is received by the reader module, for subtracting heat from the reactor vessel so as to cool the test sample.

The invention is particularly applicable to thermal cycling PCR (polymerase chain reaction) methods.

As used herein, the word "consumable" takes its common meaning, that is to say a disposable product which is discarded having reached its end-of-life, typically after a single use.

Inclusion of the heater and the temperature sensor within the consumable amplification module advantageously allows for the rapid and precise adjustment of temperature of the reaction volume (reactor vessel) with a high degree of temperature uniformity. The claimed invention therefore provides fast and accurate thermal control in a low-cost device. Provision of the heater controller in the reader module allows the consumable amplification module to be made conveniently compact, and avoids the cost implication of having to dispose of the heater control apparatus along with the other, more readily disposable and low cost elements of the system which are provided in the amplification module.

The thermal interface and the heat sink may form a unitary structure.

The heat spreader may have smaller heat capacity than the heat sink.

The reader module may comprise a cooler device configured to cool the heat sink. The cooler device may comprise a thermoelectric cooler or a fan.

The system may comprise a heater support arranged to provide said thermal contact between the heater and the heat sink or the heat spreader. The heater support may have a thermal resistance×area product in the range $1\times10^{-4}$ to $1\times10^{-2}$ $K\cdot m^2/W$ and preferably in the range $3\times10^{-4}$ to $3\times10^{-3}$ $K\cdot m^2/W$.

The reader module may comprise an optical system for detecting reactions in the test sample when the amplification module is received by the reader module, the optical system comprising: an optical interface for connecting the optical system to the amplification module; a light source for providing light to the test sample; and a photodetector for detecting changes in the transmission, absorption, reflection, or emission, of light by the test sample.

The reader module may comprise a pneumatic system for controlling pressure and/or motion of the test sample when the amplification module is received by the reader module, the pneumatic system comprising: a pneumatic interface for connecting the pneumatic system to the amplification module; a pneumatic pump for providing pressure and/or motion to the test sample via the pneumatic interface; and a pneumatic controller for controlling the pneumatic pump.

The amplification module may comprise a detector for detecting electrochemical changes in the test sample contained in the reactor vessel; and the reader module may be adapted to receive a signal from the detector via the electrical heater interface when the amplification module is received by the reader module.

The heater element may comprise the temperature sensor, the temperature of the heater element being determinable from an electrical resistance of the heater element.

The reader module may be adapted to receive a plurality of said amplification modules.

The reader module may be adapted to perform synchronous and/or asynchronous testing on a plurality of test samples contained by the respective amplification modules.

According to another aspect of the invention, there is provided a consumable amplification module for insertion into a reader module of a system for nucleic acid amplification testing, the amplification module comprising: a reactor vessel for containing a test sample; a heater comprising a heater element in thermal contact with the reactor vessel and being adapted to receive a control signal, from an external controller, to add heat to the reactor vessel so as to heat the test sample; a temperature sensor for determining the temperature of at least one of the heater element and the test sample; and a heat sink in thermal contact with the heater for subtracting heat from the reactor vessel so as to cool the test sample.

According to another aspect of the invention, there is provided a consumable amplification module for insertion into a reader module of a system for nucleic acid amplification testing, the amplification module comprising: a reactor vessel for containing a test sample; a heater comprising a heater element in thermal contact with the reactor vessel and being adapted to receive a control signal, from an external controller, to add heat to the reactor vessel so as to heat the test sample; a temperature sensor for determining the temperature of at least one of the heater element and the test sample; and a heat spreader in thermal contact with the heater, the heat spreader being adapted for thermal contact with a thermal interface of a heat sink of the reader module when the amplification module is received by the reader module, for subtracting heat from the reactor vessel so as to cool the test sample.

BRIEF DESCRIPTION OF THE DRAWINGS

Examples will now be described, with reference to the accompanying figures in which.

DETAILED DISCUSSION

Figure 1:
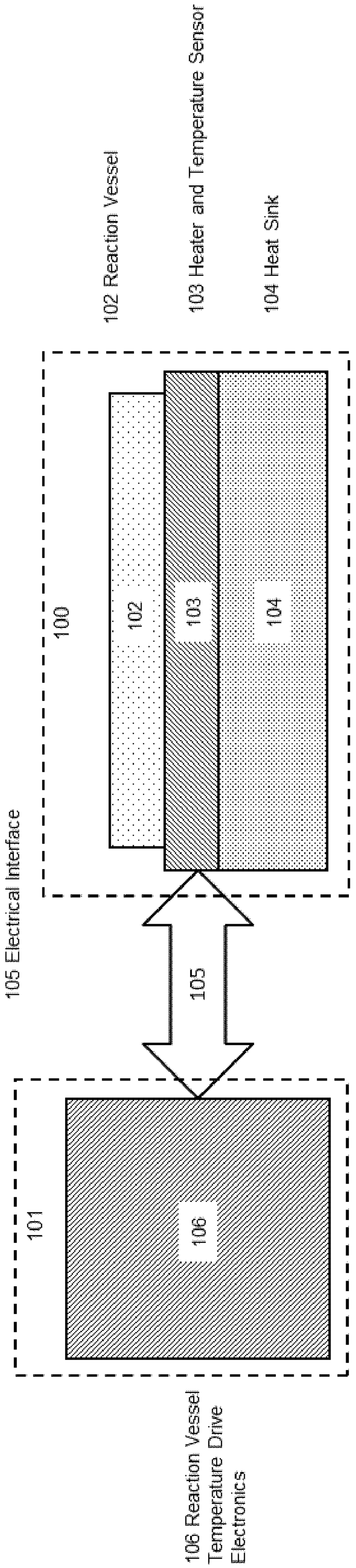
FIG. 1 shows a system comprising a consumable module and a reader module, according to an example.

Referring to FIG. 1, an example system for nucleic acid amplification testing (NAAT) comprises a consumable part 100 and a reader part 101. The consumable 100 comprises a reaction vessel 102, a heater 103*a* and a temperature sensor 103*b* (collectively labelled 103 in FIG. 1), and a heat sink 104. The reader part 101 comprises temperature control and heater drive electronics 106. This exemplary system only requires one electrical interface 105 to run a NAAT.

In use, the reaction vessel 102 contains the reagents and sample required to perform reactions for the NAAT. The consumable 100 may contain reagents pre-loaded and a test sample can be added at the time of use.

It is important to achieve precise and uniform thermal control in NAAT as the test results are often measured by reaction rate which is highly dependent on temperature. The inclusion of the heat sink 104, heater 103*a* and temperature sensor 103*b* in the consumable makes it possible to have a uniform, permanent thermal contact between the sample volume in the reaction vessel 102 and the temperature control thermal engine, i.e. the heater 103*a* and temperature sensor 103*b* and heat sink 104.

Figure 2:
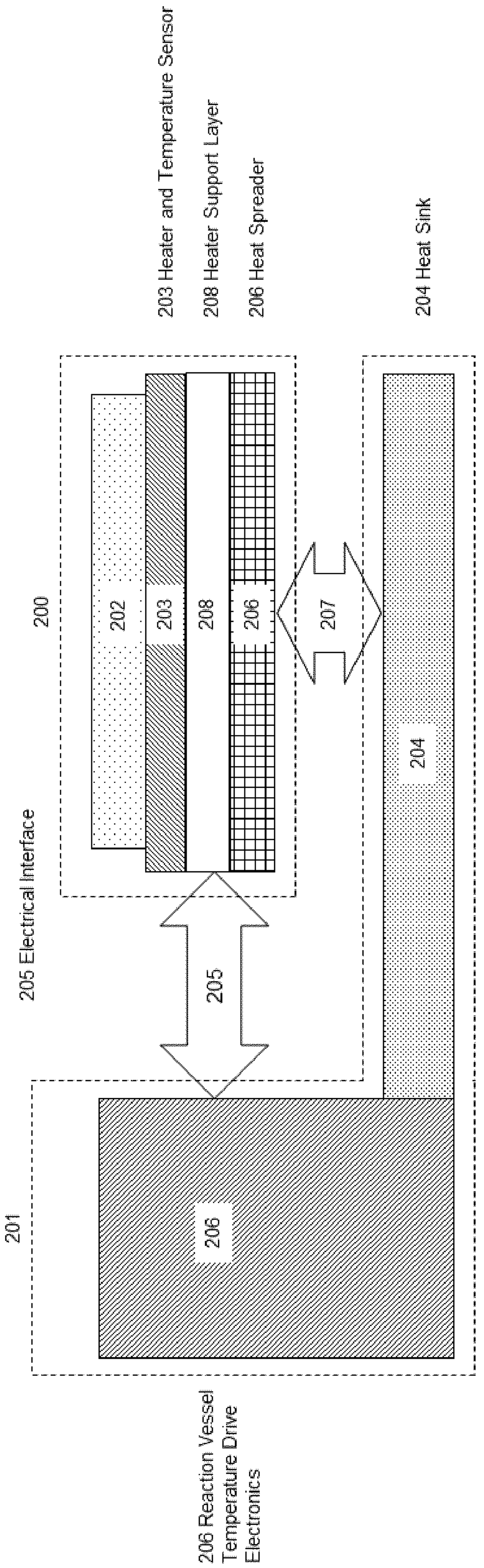
FIG. 2 shows a system comprising a consumable module and a reader module, according to another example.

In some situations, it may be undesirable to include a heat sink of high thermal mass in the consumable 100; for instance, due to environmental sustainability or cost concerns, to avoid disposal of non-negligible quantities of metal heat sink material with each test. FIG. 2 depicts an alternative configuration that reduces the material in a consumable part 200 by providing a heat sink 204 in a reader 201. In this example the reader 201 comprises, in addition to the temperature drive electronics 206 and electrical interface 205, a thermal interface 207 between the heat sink 204 and consumable 200.

Good uniformity in thermal contact may be difficult to achieve between a reader surface and consumable, particularly when using a simple, low cost connection mechanism. To address this problem the consumable comprises a thin heat spreading layer 206 of a material with high thermal conductivity. In this example the consumable 100 comprises an optional heater support layer 208 disposed between the heat spreader 206 and the heater 103*a* and temperature sensor 103*b*. Alternatively the heat spreader 206 is arranged to be in direct, close and uniform contact with the reaction vessel 202 and heater temperature sensor 203*b*. While in this example the heater support is configured as a continuous layer of material, between the heat spreader 206 and the heater 103*a* and temperature sensor 103*b*, it will be understood that the heater support may be configured in various different ways so as to support the heater 103*a* and temperature sensor 103*b* on the heat spreader 206. For example, the heater support may comprise a ribbed structure, having discontinuities in the structure material between the heat spreader 206 and the heater 103*a* and temperature sensor 103*b*.

It is also desirable to control the rate of cooling of the heater 103*a* and reaction vessel 102 due to heat flow into the heat sink 104 when the heater 103*a* is not driven. The cooling rate depends on the thermal resistance of a heater support layer 208, $R_T$, which can be optimised to minimise the thermal cycling time for a given temperature profile and heatsink temperature $T_{Sink}$ and heater power $p_{Heat}$. The time required for thermal cycling between a $T_{LOW}$ and $T_{HIGH}$ is minimised when the heating time is equal to the cooling time and this condition is satisfied when $R_T = R_{T,Opt}$ as follows:

$$R_{T,Opt} = (T_{HIGH} + T_{LOW} - 2T_{Sink}) / p_{Heat}.$$

Appended Table 1 shows example values for heater power, optimal thermal resistance and thermal cycle time. These are shown for the case of a reaction surface with area 50 $mm^2$ and with heat capacity 0.04 J/K, cycling between 60° C. and 95° C. with a heat sink temperature of 30° C.

Appended Table 2 shows example values for heater power, optimal thermal resistance and thermal cycle time for the case where the thermal cycle includes a hold step of 1 s duration at 72° C. These are shown for the case of a reaction surface with area 50 $mm^2$ and with heat capacity 0.04 J/K, cycling between 60° C. and 95° C. with a heat sink temperature of 30° C.

Figure 3:
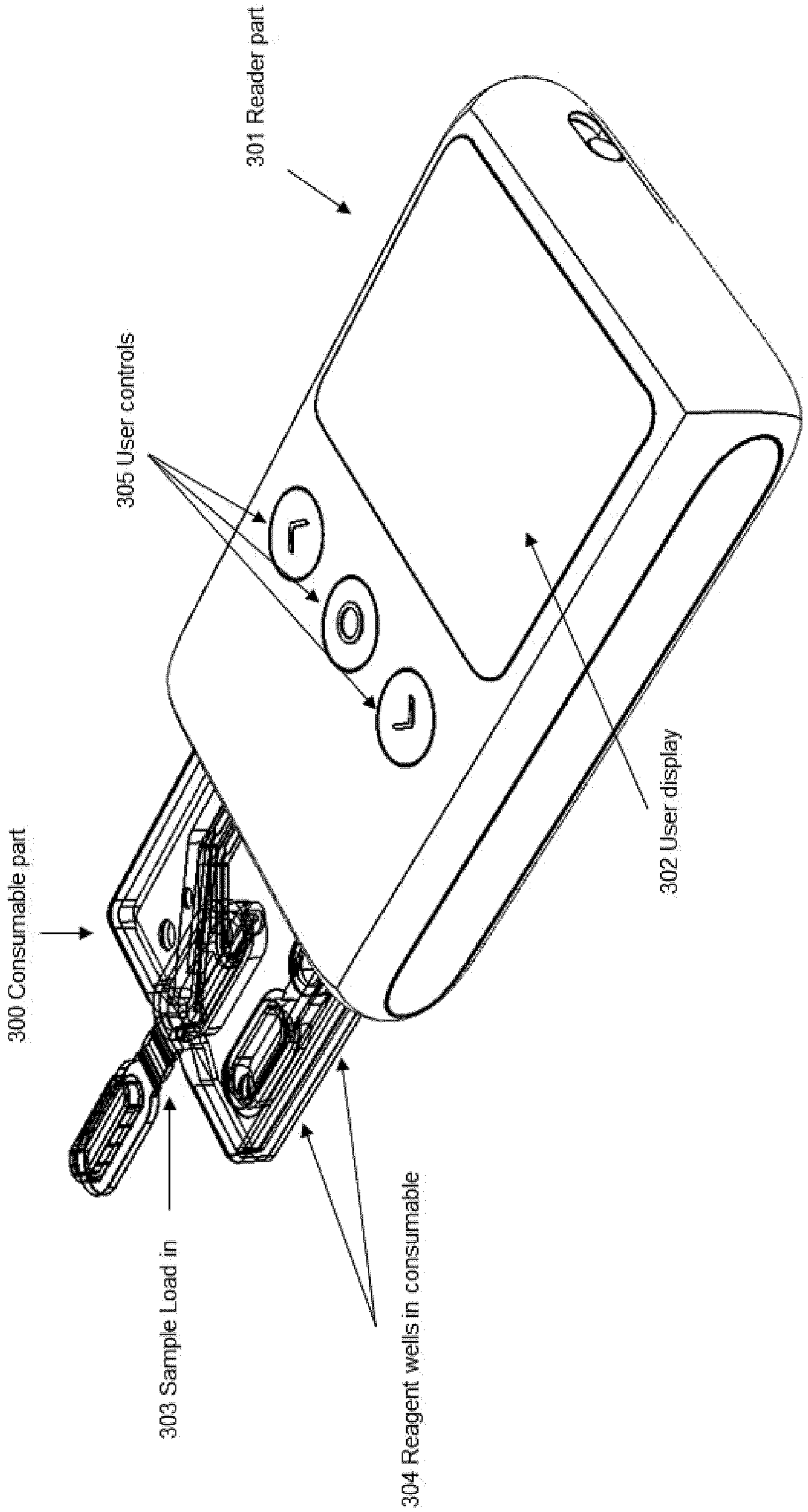
FIG. 3 shows an exemplary product comprising a consumable module and a reader module.

FIG. 3 depicts an exemplary product for a full sample to answer system for performing NAAT with a low cost, portable instrument for carrying out these tests in a near patient environment. In this example the reader part 301 includes a display 302 for indicating to the user the result of the test, and buttons 305 for user control. The consumable part 300 comprises a space (i.e. a cavity or volume) for simple sample load 303 as well as fillable reagent wells 304 to allow non-laboratory personnel to carry out tests with little to no training.

Figure 4:
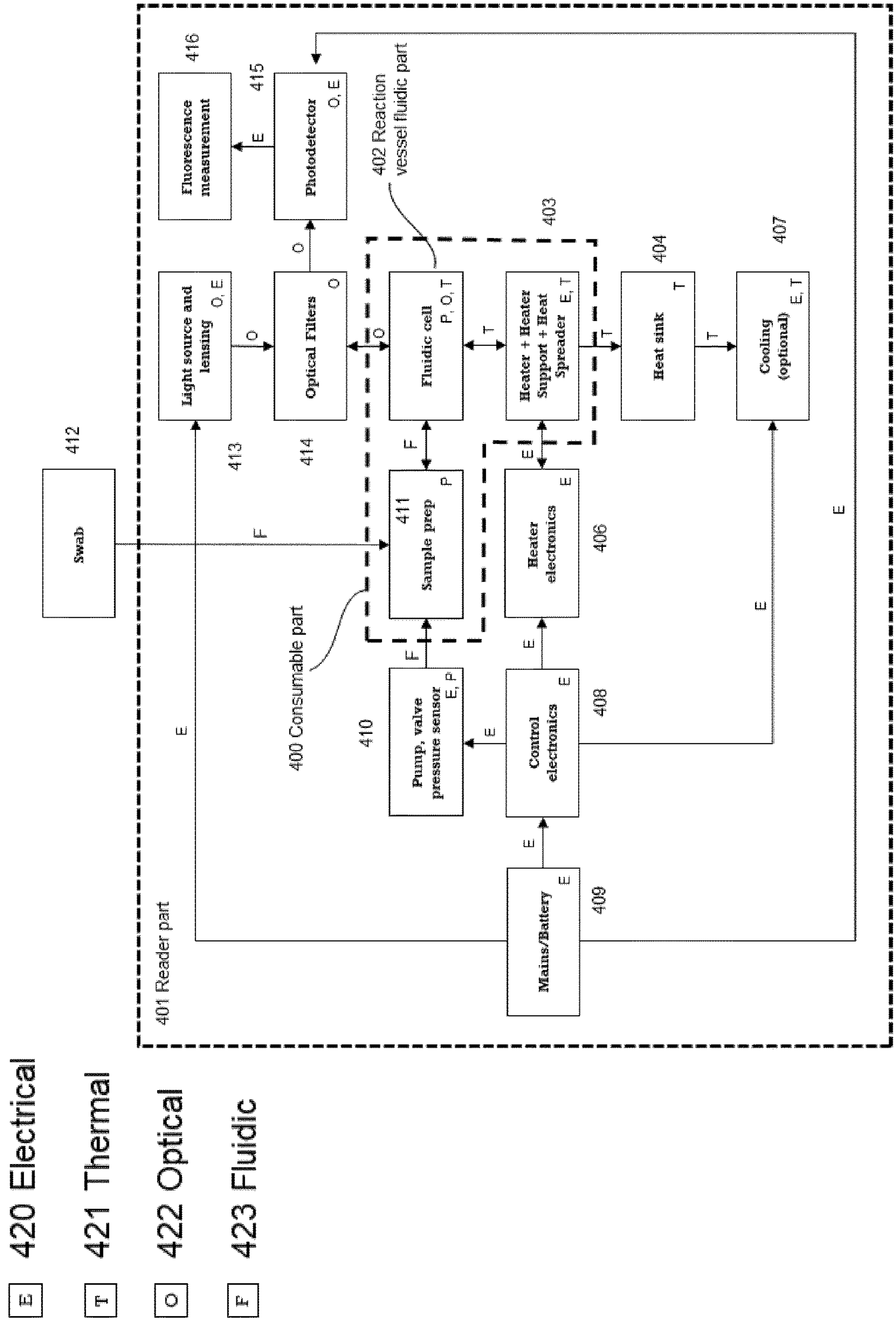
FIG. 4 is a system schematic, for example for a product as shown in FIG. 3.

FIG. 4 depicts a system schematic, for example for a product as shown in FIG. 3. In this example the consumable part 400 contains sample preparation features 411 to condition a sample loaded from a swab 412 ready for the NAAT in the reaction vessel 402. The heater, temperature sensor and heat spreader 403 are included in the consumable 400. The consumable and the reader 401 are interfaced electrically 420, thermally 421, optically 422 and fluidically 423. The electronics in the reader 401 control the external user interface (302 and 305 of FIG. 3) as well as the temperature of the heater 403, by providing electrical power from the power source 409 mediated by the closed loop heater controller 406. The control of the system may include active cooling 407 of the heat sink 404, via a Peltier element or variable speed fan for example.

The sample preparation steps 411 are controlled by the fluidic system 410 which may contain, for instance, an air pump and a pressure sensor for providing metered pressure and positive displacement to the consumable 400 fluidics via a pneumatic interface. This exemplary system uses an optical detection method for detecting the result of the test. An optical interface 422 between the reader 401 and consumable reaction vessel (or fluidic cell) 402 is ported to a reader optical system comprising, in this example, a light source and lensing 413, excitation and emission filters 414, and a photodetector 415. This configuration may be used to detect the presence of amplified DNA via fluorescent probes by exciting at one wavelength of light and detecting at the wavelength of fluorescence.

Figure 5:
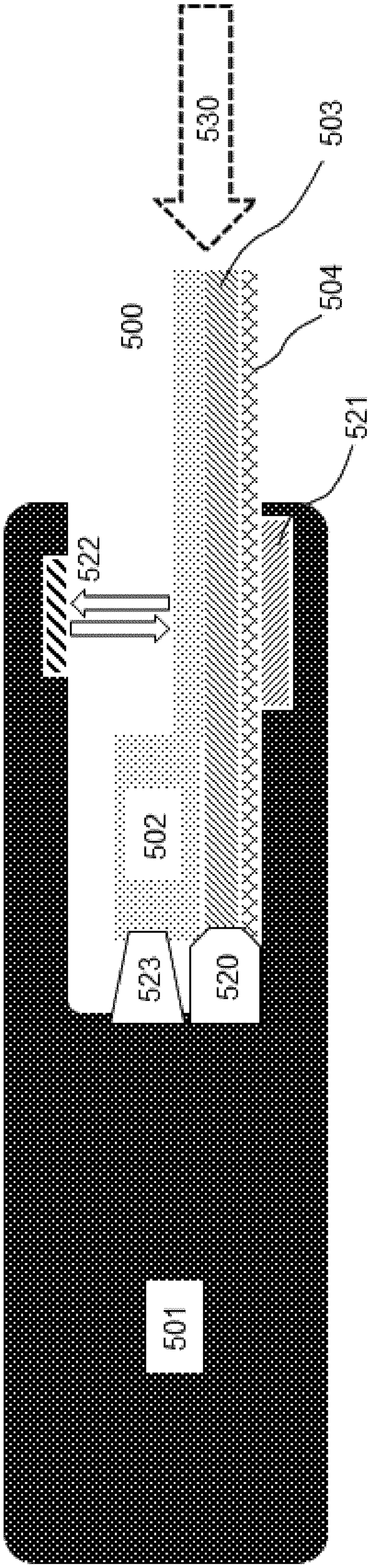
FIG. 5 shows a consumable module received in a reader module.

FIG. 5 depicts a cross-section of an exemplary small reader 501 with inserted (received) consumable 500. An electronic connection 520 and a pneumatic connections 523 are positioned on the same face of the reader 501 to allow a single-plane consumable 500 which can be conveniently inserted into the instrument 530. In an example, there is provided a secondary mechanical interface, between the consumable heat spreader or heat sink 504 and a reader heat sink 521, to increase thermal mass for tests that require fast cooling thermal cycling. The thermal interface, between the heat sink 504 of the consumable 500 and the heat sink 521 of the reader 501, may comprise a sliding contact for simple mechanical assembly and insertion of the consumable part 500.

Analyte may be detected using an optical interface 522 or directly through the same electrical interface 520 as the heater control. If an optical interface is used it may be configured as depicted in FIG. 5, with illumination and detection perpendicular to the plane of the fluidic part containing the reaction volume 502 to reduce the number of optical faces on the consumable part 500. A series of detection methods can be used to detect and/or quantify the nucleic acid in the sample; a summary is included in appended Table 3.

Figure 6:
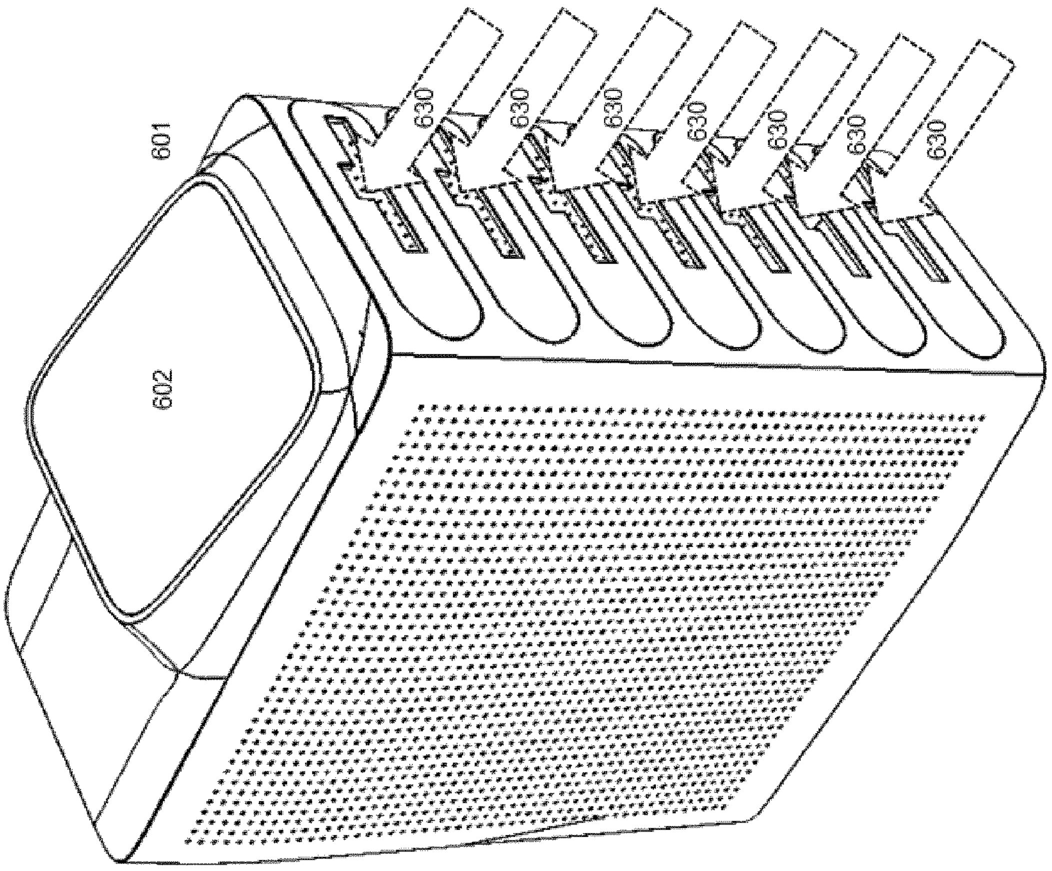
FIG. 6 shows a reader module for receiving multiple consumable modules.

FIG. 6 depicts an exemplary product for a multi-up system wherein a desktop reader 601 can accept several consumable parts 630 to run multiple tests simultaneously, synchronised with each other or asynchronously. The reader 601 comprises a display 602 for outputting the test results. An advantage of this system in a near to patient setting is to increase test throughput, reducing reader cost-per-test as parts of the system control can be shared between the separate consumable interfaces.

A reaction vessel should maintain good temperature uniformity and control. In particular, the construction of a vessel's reaction volume may be made thin compared to its width, the reaction volume to dominate the heat capacity of the vessel with uniform good thermal contact between heater, temperature sensor and reaction volume.

Figure 7:
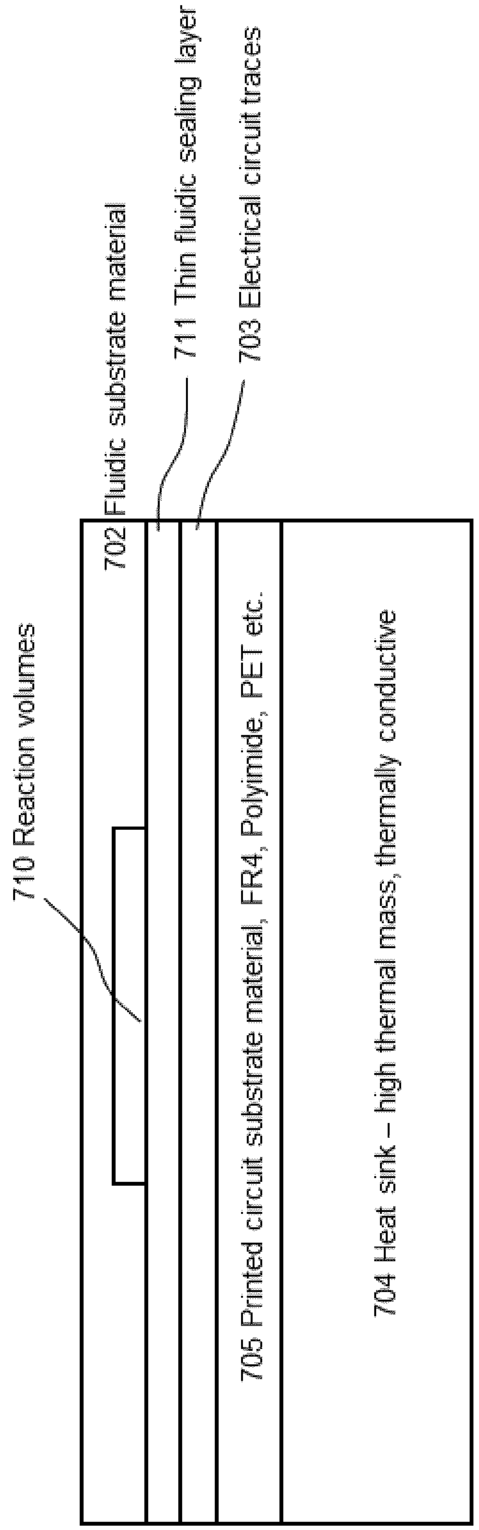
FIGS. 7 to 9 show structures of exemplary consumable modules.

FIG. 7 depicts a cross-section of an example system consumable. In this example the reaction volume cavity 710 is constructed out of a fluidic substrate material 702 via a process such as embossing, injection moulding or similar, and closed via a thin sealing layer 711. The thickness of the sealing layer 711 is determined by the requirements for temperature accuracy and thermocycling speed within the reaction volume 710. This film may be attached to the fluidic substrate material via an adhesive or heat-sealing process, and, via the same or similar process, the other side of this film may be attached to the heater and temperature sensor.

In this example, the heating and temperature sensing are carried out via resistive traces 703 on an insulating substrate 705 manufactured inexpensively using a standard lamination and etch printed circuit board (PCB) or flexible circuit process. These traces may also be formed via a process such as sputtering, evaporating or electroplating. The reverse side of the insulative substrate material 705 is joined with high and uniform thermal conductance to a heat sink 704 with a high thermal mass to enable passive cooling of the reaction volume 710 over the course of the test. The lower temperature heat sink 704 and higher temperature reaction volume 710 will thermally equilibrate and therefore, to maintain stable and consistent cooling rates, the temperature rise in the heat sink 704 should be minimal, for example less than 10° C. over the course of a test.

Figure 8:
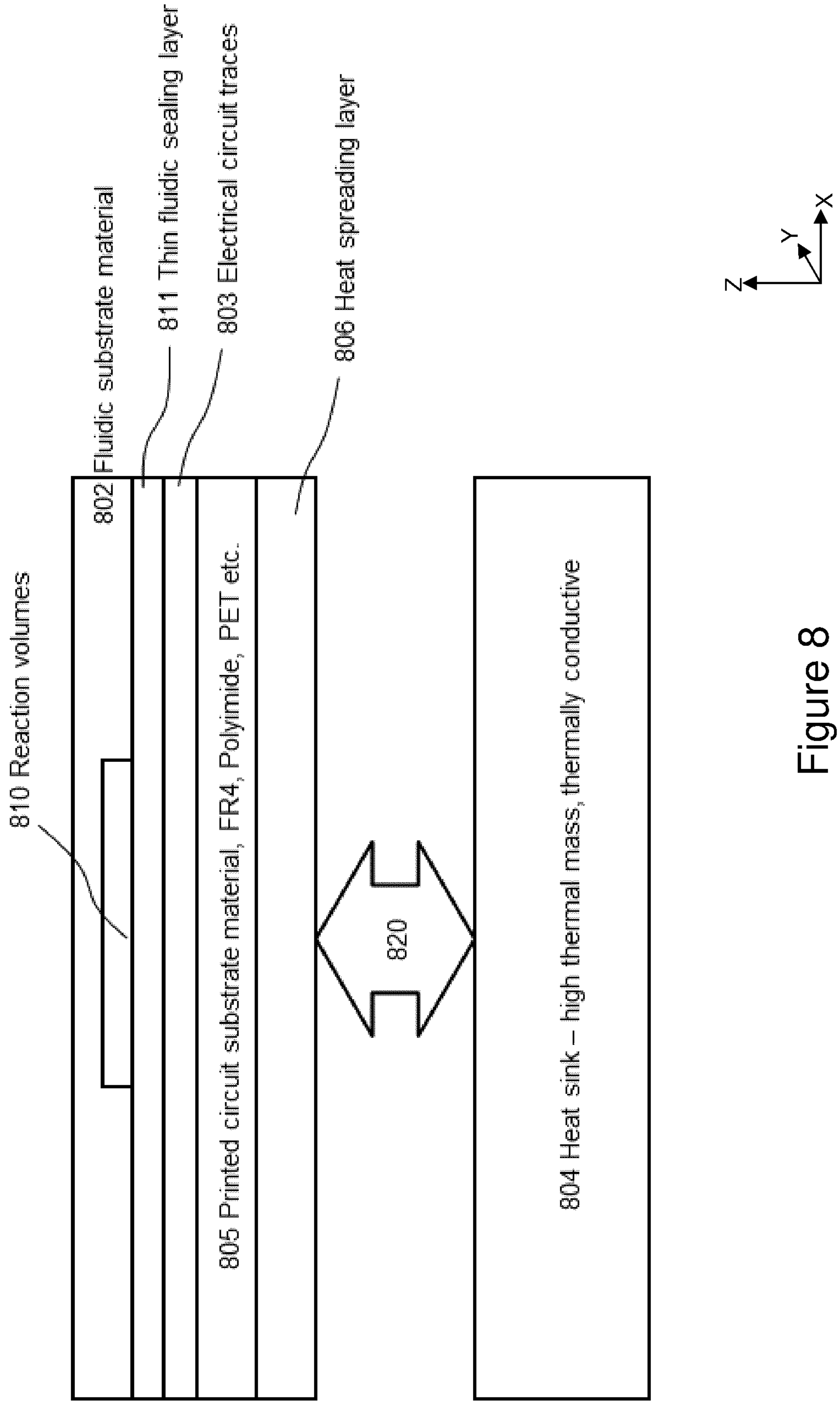

FIG. 8 depicts a cross-section relating to a system example such as is shown in FIG. 2, whereby the heat sink part 804 is provided in the reader part and the system comprises a thermal interface 820 between the consumable and reader. Conventional systems suffer difficulties in achieving uniform, low resistance, thermal contact. Conversely, in this example the consumable comprises a heat spreading layer 806 to provide the reaction vessel 810 with a laterally uniform thermal surface, reducing the precision required in the thermal interface 820. This heat spreading layer 806 may be constructed via the same processes as the electrical circuit traces 803 on the reverse side of the insulative substrate 805, for instance, another layer of copper on a multi-layer printed circuit board. The reaction volume 810, fluidic substrate material 802, and thin fluidic sealing layer 811, are as shown in FIG. 7.

Figure 9:
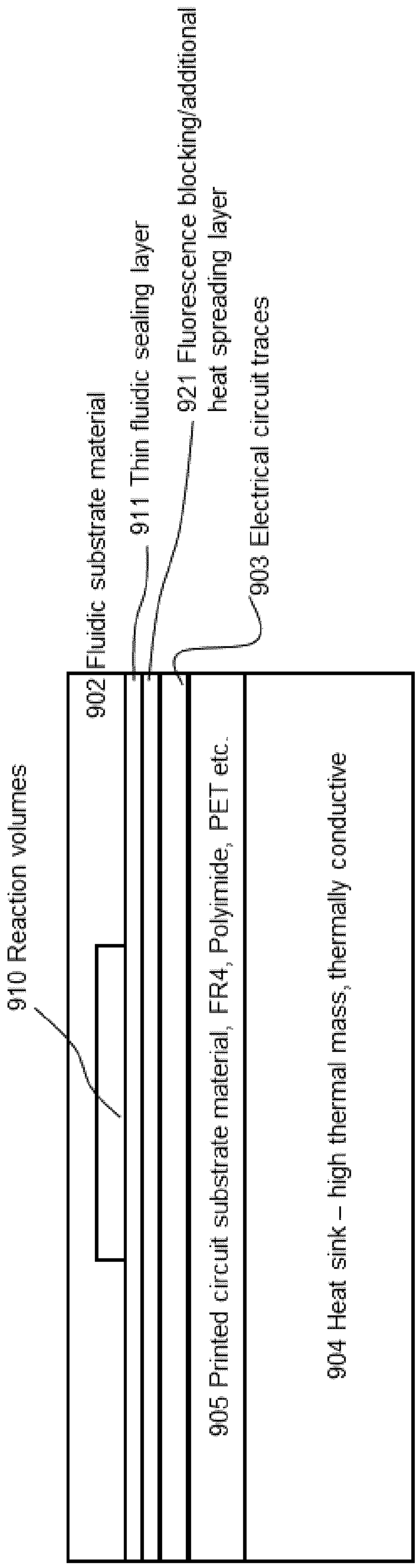

In systems that use an optical detection method, it may be required to include an optical layer in the stack of materials to prevent stray signals and improve noise floor. FIG. 9 depicts the addition of this optical layer 921 in the cross-section of the reaction vessel 910, the optical substrate 902 being sufficiently transparent to observe changes within the reaction volume 910. For example, PCB materials such as FR4 have fluorescent properties that may interfere with sample fluorescence detection; therefore it is beneficial to include an opaque layer between or within the fluidic sealing layer 911 and 903 heater circuit traces. The opaque layer may be thin metal layer functioning as a barrier to light transmission and as a reflector to increase the signal received by an optical detector.

Using a metal or other highly thermally conductive layer in position indicated by 921 in FIG. 9 has the added benefit of being a heat spreading layer. The heat spreading layer may increase the uniformity of the temperature in the sample volume 910 while having heat capacity significantly smaller than the heat capacity of the sample or surrounding fluidic cell, so the inclusion of the heat spreader layer does not significantly increase the heating and cooling power required to change the sample temperature.

Figure 10A:
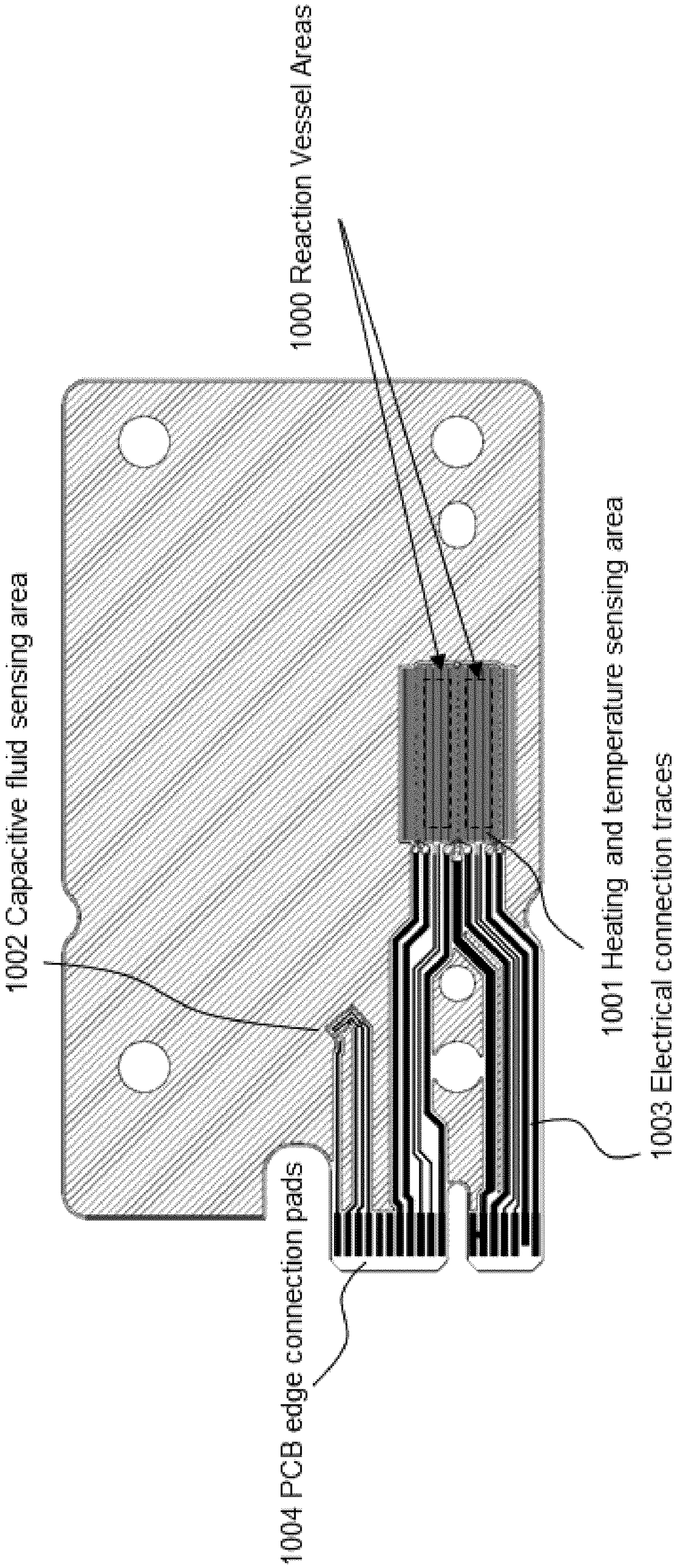
FIG. 10A shows printed circuit traces of a consumable module and FIG. 10B shows electrical heater connections of a consumable module.

FIG. 10A depicts an example layout for printed circuit traces 1003 for two reaction volumes 1000 of a consumable with heater and temperature measurement traces 1001. The single layer is designed to fit a standard off-the-shelf PCIE edge connector to form the electrical interface 1004 with the reader. Traces 1003 connect heaters, temperature sensing and another set of electrodes for the measurement of fluid progress through the consumable. In this example, the change in dielectric in the fluid layer above the circuit substrate as liquid is flowed past the electrodes is measured using capacitance sense electronics in the reader part to detect fluid in the chip has reached this stage in the assay.

A benefit of detecting the presence or flow of the liquid on the consumable is that it allows a fluidic control without the need to measure or control the displacement volume generated in the reader to calculate the position of the liquids on the consumable. There are several techniques that can be used with this consumable construction: capacitance and resistive sensing can both detect the presence of liquid near a set of electrodes. Resistive sensing techniques are more stable but require electrodes in electrical contact with the reaction volume, whereas capacitance measurements require more sensitive electronics but can measure through the thin fluidic sealing layer and can use electrical tracks fabricated in the same printed circuit layer as the heater tracks.

A further technique for detecting the presence or flow of liquid in the consumable is to carry out a thermal measurement using heater and sense traces. Flow is measured by observing the time of flight of a heat pulse using a central heater trace located between upstream and downstream temperature sense traces. Liquid presence can be measured by observing the increase in heat capacity and corresponding decrease in temperature change at or near a heater track located near a fluidic channel.

Figure 10B:
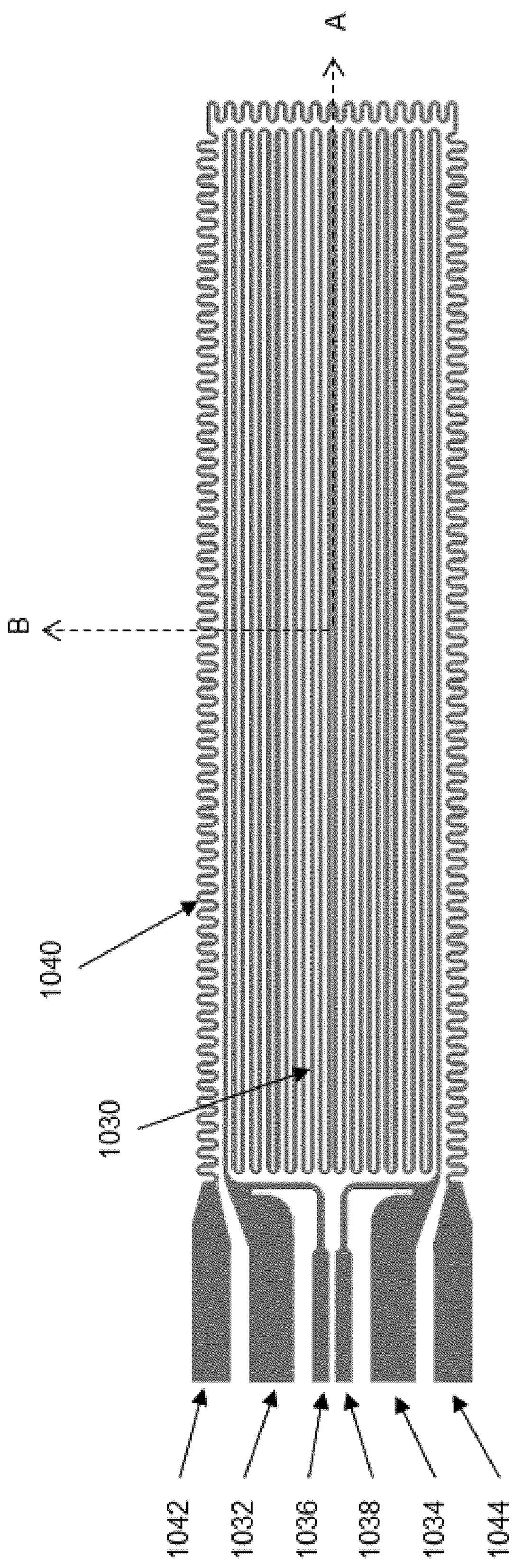

FIG. 10B depicts a close-up of a heater region on the consumable circuit substrate, showing the various electrical connections to the heater. For precise measurements of heater resistance, and therefore reaction vessel temperature, a four-wire Kelvin connection to the heater track is provided. By splitting the heater electrical connections into drive current 1032, 1034, and voltage sense 1036, 1038, the voltage across the heater region is measured at the points of current entry and exit to the heater track. Little current flows across the voltage sense interface, minimising the influence of electrical resistance in the electrical interface between the reader and consumable on the measurement of heater trace resistance. This is advantageous for a separate/separable reader and consumable, as it improves the accuracy and reliability of the reaction vessel temperature control using resistance thermometry.

The two outer connections 1042 and 1044 are provided to drive a guard heater track to a temperature equal to or higher than the main heater to improve temperature uniformity within the heater zone by compensating for edge effects, thereby maintaining a uniform temperature throughout the reaction volume and improving the efficiency of the reaction.

Figure 11:
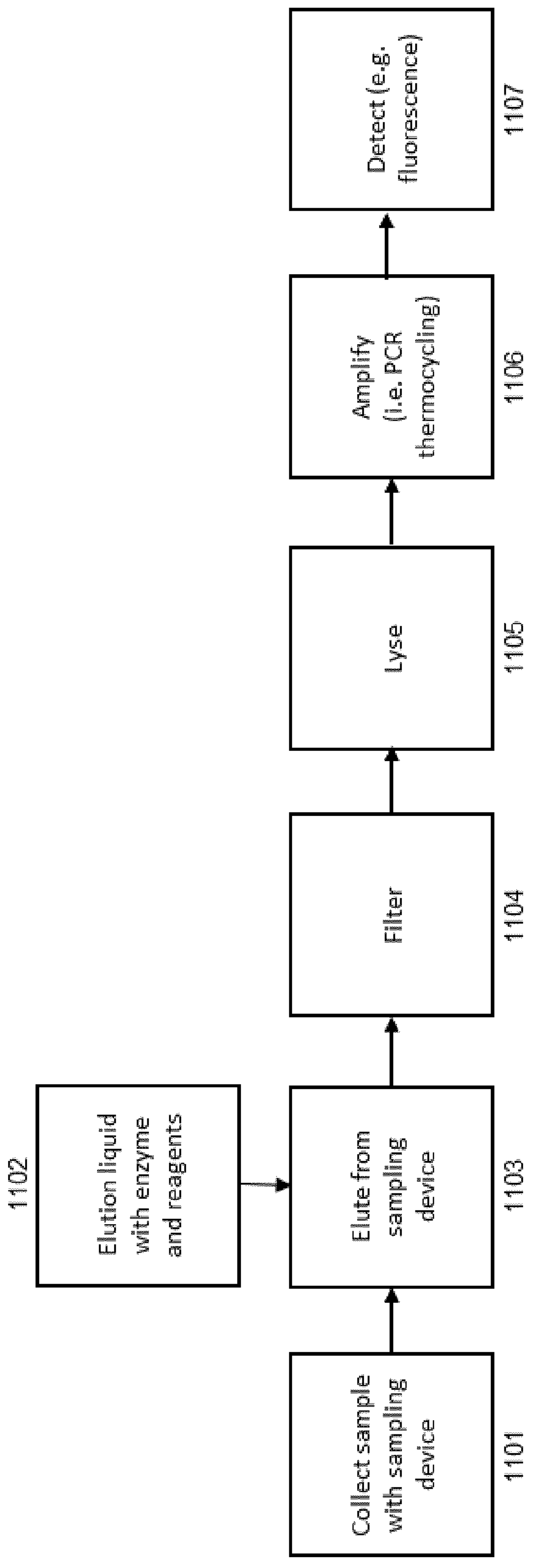
FIG. 11 shows a sequence of assay steps for detection of DNA sequences.

In an example, the consumable can be designed to run a polymerase chain reaction (PCR) assay to detect occurrences of specific sequences. FIG. 11 shows a process flow chart for how such an assay could be carried out by the system disclosed. A sample would be collected using a sampling device 1101, i.e. swab, and loaded into the consumable part. The consumable or sampling device may contain elution liquid, which may contain enzyme and reagents to elute cells or DNA from sampling device 1102, and the fluidic system will push liquid through a filtration system 1104 to reject contaminates and reaction inhibitors while retaining DNA and enzymes. If the assay is designed to examine cellular DNA, the cells will need to undergo lysis 1105 to break DNA strands free of the cell walls before the amplification step 1106. If a thermal lysis method is used then lysis and amplification will be carried out in temperature-controlled reaction vessels.

An advantage over conventional systems and methods is that the temperature of the full reaction volume can be precisely controlled and changed (heated or cooled) at fast ramp rates. If a thermocycling amplification technique is used, this system can carry out the required number of thermal cycles, typically between 20 and 60, to quantitively detect DNA amplification and determine presence and concentration of target DNA sequences in a much shorter time than conventional DNA detection devices. Following thermocycling, amplified DNA detected via one of the methods discussed in Table 1 above and result is displayed to the user or uploaded to an online database.

Figure 12:
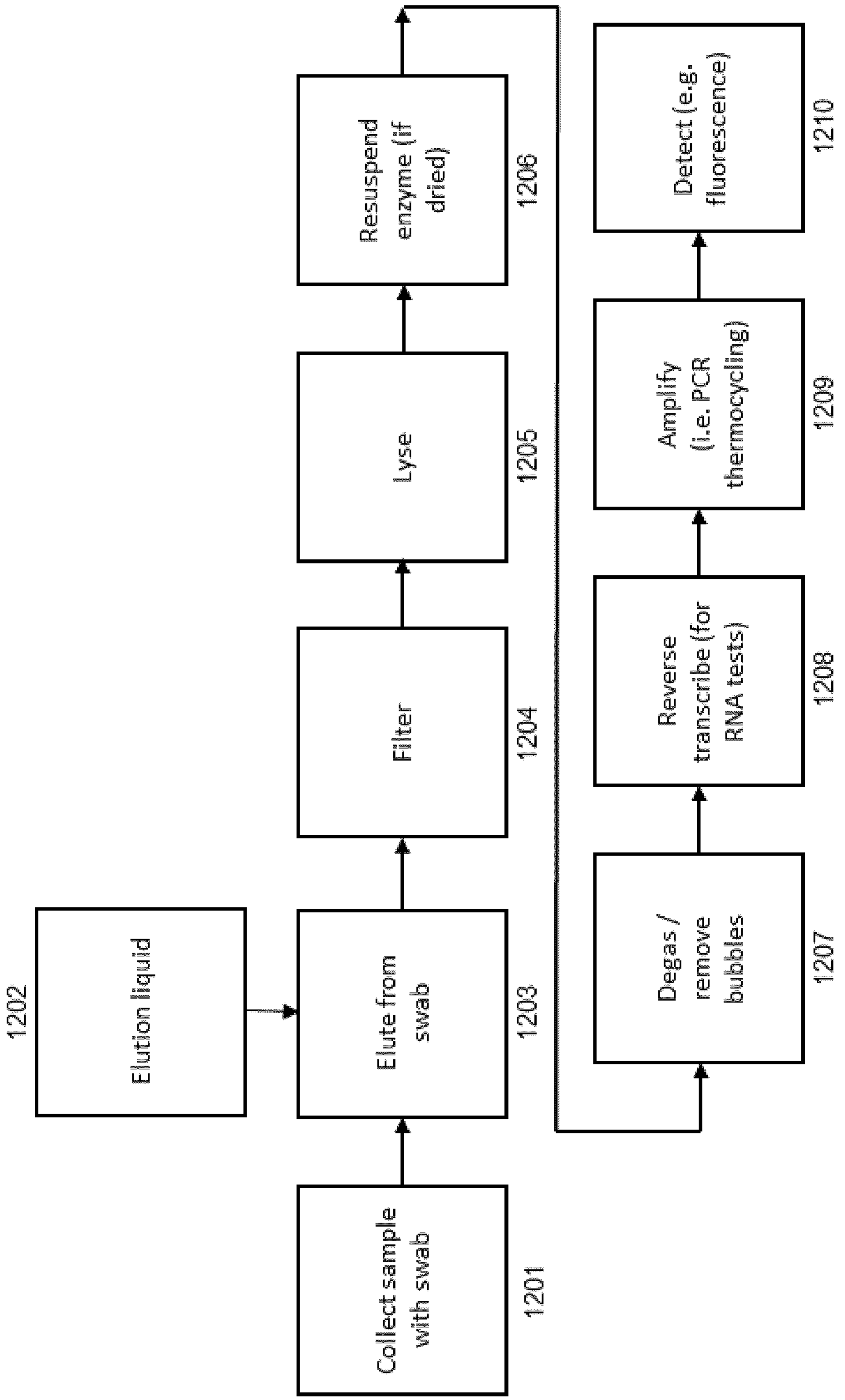
FIG. 12 shows a sequence of assay steps for detection of RNA sequences.

In an example, if the nucleic acid of interest is Ribonucleic acid (RNA) then the consumable could be designed to run a "reverse transcription" PCR test (RT-PCR). Referring to FIG. 12, after the sample is taken and loaded into the device 1201, an enzyme free elution liquid elutes sample from swab 1203, filtered and lysed to release the RNA into the reaction mixture. The mixture is then introduced to the RT enzyme; this happens at this stage to prevent damage to the RT enzyme during the lysis step and allows the enzyme to be freeze dried to give the consumable a greater shelf life. A known issue with resuspension of freeze-dried enzymes 1206 is that the enzymes may be effervescent and tend to produce gas bubbles in the mixture that can make amplification detection difficult. To mitigate this risk, a degassing or bubble trap step 1207 is used to ensure non-gassy mixture ends in the amplification chambers where the mixture is heated to reverse transcribe the RNA into DNA 1208 and thermocycled to detect the presence of specific DNA sequences 1209. Amplified DNA is detected via one of the methods described in Table 1 above.

The thermal design of the reaction vessels in the consumable part of the system can be optimised, to carry out the NAAT temperature dependent processes described in appended Table 4.

Figure 13:
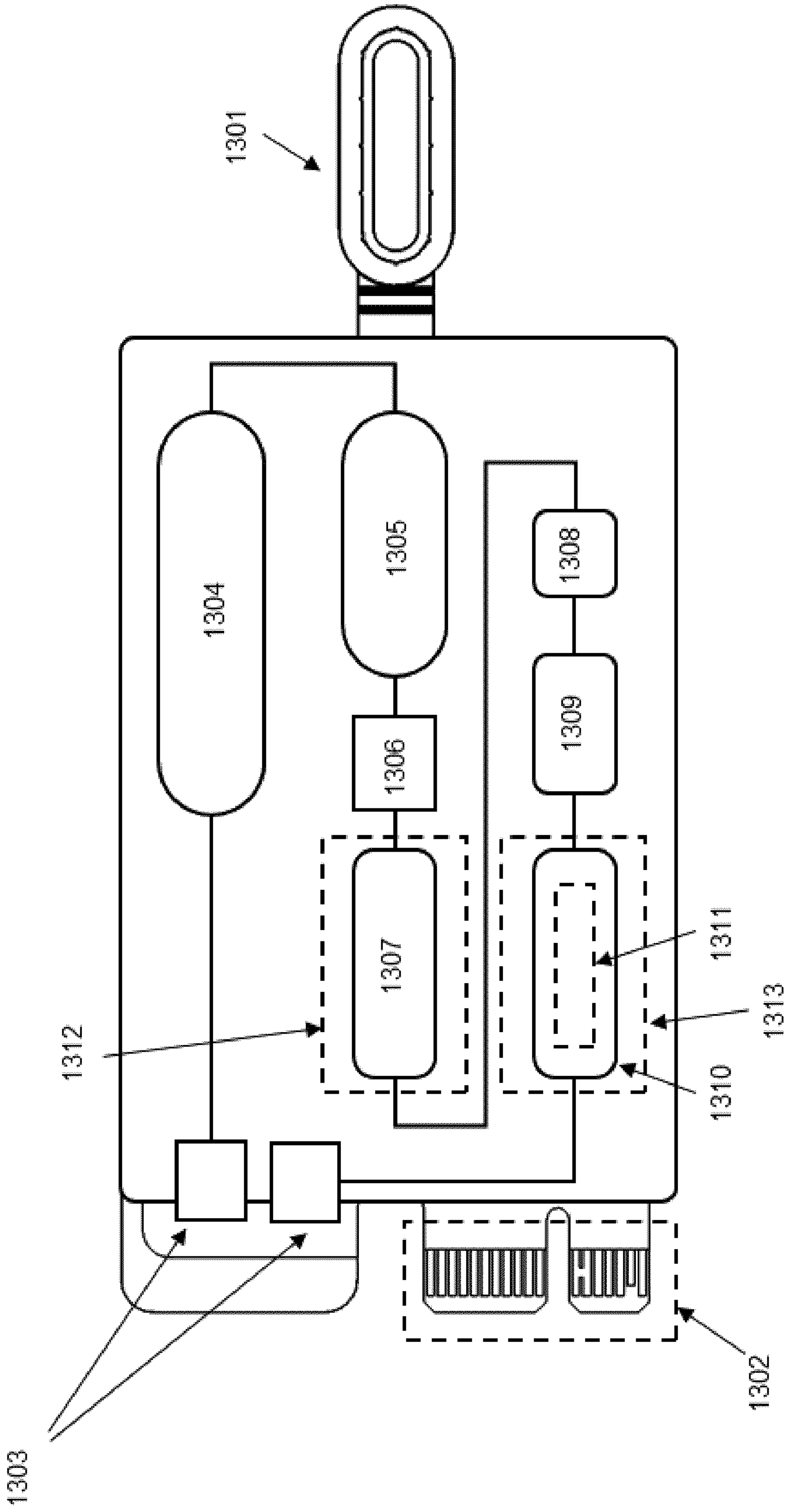
FIG. 13 shows a schematic plan view of a consumable module.

FIG. 13 depicts an example of the consumable part of a NAAT system in plan view with areas designated for the various assay processes. A snap close lid feature 1301 seals the sample into the consumable; this feature could also be used to provide actuation force to pressurise the fluidic system, drive liquids through channels, or to break a foil seal. An electrical connection area 1302 is designed to slot into a standard PCB edge connector and on the same face are located ports for push fit pneumatic connections 1303. A reservoir for storage of elution liquid 1304 may be sealed from the dry part of the consumable using a foil seal or similar, and the seal may be broken following sample load into area 1305. Elution liquid carries the sample from a load area 1305 and through a filter 1306 and then to a reaction area 1307 designed to lyse any sample cells or virus particles to release nucleic acids. Lysis may be carried out by heating the sample, in which case the reaction area 1307 is located over a first heater 1312.

After the lysis step the sample and elution liquid mixture may be mixed with dried or lyophilised reagents and enzymes in 1308 and then flowed into a bubble trap/degassing area 1309. The bubble-free mixture is then moved into the second reaction vessel 1310 located over a second heater 1313. The sample may be divided into separate detection chambers within the second reaction vessel 1310 each containing a different primer set to amplify a specific nucleic acid sequence. A separate detection chamber may be used for each test or control sequence to be detected. The second heater 1313 may be used to provide thermal cycling for PCR amplification. The result of the test may be detected optically within an optical detection area 1311. Following amplification, optionally a melt curve may be measured by ramping the temperature of reaction vessel and detecting the thermal denaturation of amplified DNA.

Figure 14:
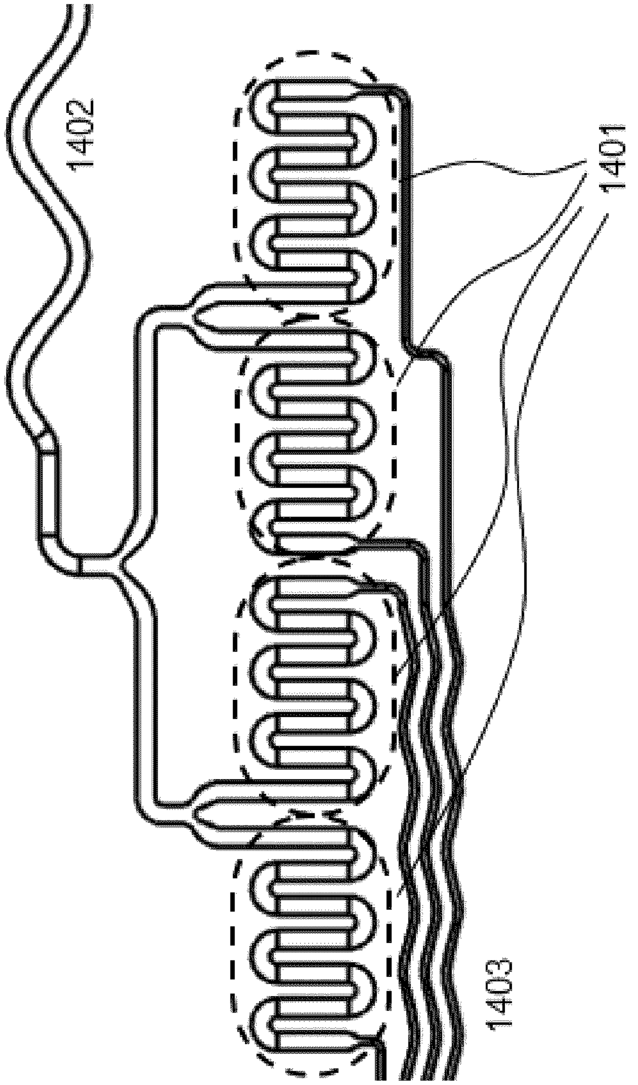
FIG. 14 shows fluidic channels in which a sample is divided for spatially-multiplexed fluorescence detection.

FIG. 14 depicts a plan view of an exemplary consumable reaction vessel for detecting four specific nucleic acid sequences, or three test sequences and a positive control sequence. In this example, detection chambers 1401 are formed from serpentine channels to ensure even filling of all four channels without air pockets. It can be seen than the input to the reaction vessel 1402 is much wider than the outlets 1403, in order to increase viscous drag once a chamber has been filled, to ensure that the capillary pressure is burst on each detection chamber input.

Figure 15:
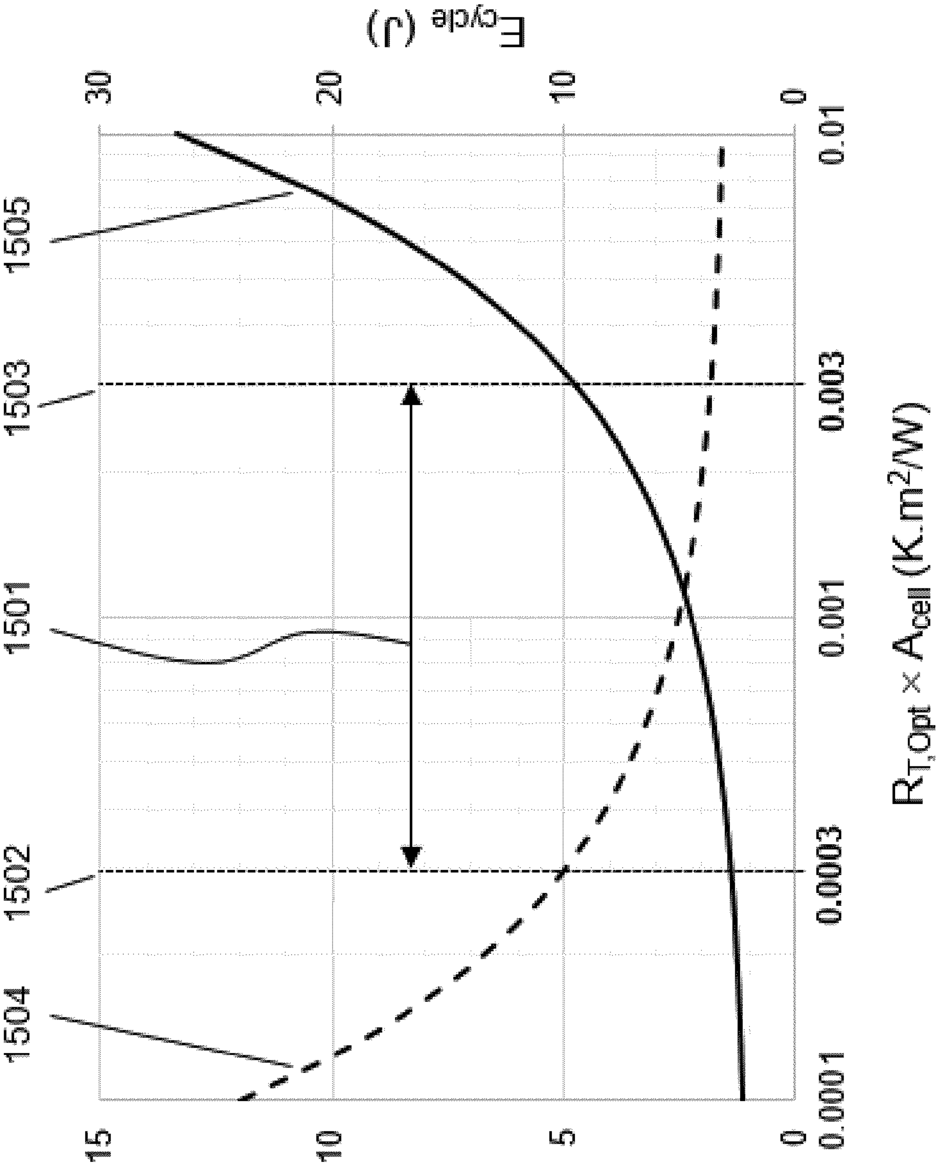
FIG. 15 shows the preferred range of thermal resistance when a hold step is included in the thermal cycle.

FIG. 15 shows the preferred range of thermal resistance 1501 when a hold step is included in the thermal cycle. The PCR cycle consists of melt, anneal and extension steps, and extension is often the most time-consuming part of the reaction and may require a hold step. In this example a hold step of 1 s duration at 72° C. is included, to allow time for extension in the PCR reaction. The time required for extension may vary, depending on the speed of the polymerase and the length of the DNA sequence being amplified. A hold step of 1 s may be appropriate for rapid amplification of DNA sequences with length in the range 100 to 150 base pairs, a length typically used for nucleic acid based diagnostic testing, and longer sequences will generally require longer extension times. The hold step duration will optimally be long enough to allow for extension but not significantly longer, otherwise it will dominate and extend the overall cycle time undesirably. The skilled person will readily see that adjustments to the hold step duration, exemplified as 1 s in the above examples, may be made without significant consequence to the overall operation of the invention.

The graph in FIG. 15 illustrates the preferred range of values of thermal resistance to allow both low thermal cycle time and low energy consumption per cycle: the minimum thermal cycle time including the hold step, $t_{cycle}$ 1504 becomes undesirably large (>5 s) when the thermal resistance is larger than the maximum preferred value 1503, while the energy consumed per cycle, $E_{cycle}$ 1505 becomes undesirably large (>10 J) when the thermal resistance is lower than the minimum preferred value 1502. In summary, a thermal resistance×cell area product $R_{T,Opt} \times A_{cell}$, in the range $3\times10^{-3}$ to $3\times10^{-2}$ K·m$^2$/W is preferred for fast thermal cycling ($t_{cycle}<5$ s) with low energy consumption per cycle ($E_{cycle}<10$ J for $A_{cell}=5\times10^{-5}$ m$^2$).

Single wavelength fluorescence detection may be used with this detection chamber arrangement. Splitting the reaction mixture into several chambers in the reaction vessel allows multiple probes to be assessed with only one type of light source.

The quick diagnosis of patients presenting with symptoms of a viral infection can allow faster treatment pathways for the patient and a reduced strain on medical services as less patients needed to be quarantined while waiting for test results. Traditionally, molecular testing (e.g. NAATs) is carried out by a central lab that will take at least several hours, if not days, to get test results back to the care practitioners. The described system has a potential for bringing this testing to the patient and reducing sample to answer time to a matter of minutes.

One specific use of the system is for the detection of influenza virus infection in a near patient setting. A sample from a patient may be collected from a throat, nasal or cheek swab and loaded into the consumable part, whereby the virus will be eluted by an elution liquid and the reaction mixture filtered to remove large contaminates before moving to the lysis reaction vessel. After lysis, the mixture is presented to a reverse transcription enzyme and degassed if required. The mixture is then split at reaction vessel 1402 into the detection chambers where each of the four chambers 1401 may contain a probe for the dominant strains of Flu A, Flu B, Respiratory syncytial virus (RSV) and a positive control. This reaction vessel is controlled to an elevated temperature for reverse transcription and then thermally cycles the mixture to perform PCR.

The system may use the thermal properties of the reaction mixture, measured using the temperature sensor in the consumable, to analyse the result of the test.

All mechanical interfaces to the consumable, e.g. pneumatic and electrical contacts, may be provided on a single face to allow simple and robust consumable insertion.

The consumable may comprise a macroscopic fluidic substrate layer to house the sample preparation and reaction vessel volumes, a thin fluidic sealing layer, electrical circuit traces that form the thermal heater and temperature sensing areas on an insulating substrate material, and heat spreading layer to avoid need for precise thermal contact between consumable and reader.

In the consumable, a thin heat spreading layer may be sandwiched between the electrical circuit traces layer and the fluidic reaction chamber.

The consumable may comprise a fluorescence blocking layer, between the electrical circuit traces and reaction volume, to eliminate optical background noise from intrinsic fluorescence in the substrate layer, e.g. optically opaque solder mask on the circuit or metallisation in or on the thin fluidic sealing layer.

The consumable may be constructed from layers of fluidics with heat-sealable or adhesive coated polymer film laminated to form a bond between the heater and the reaction vessel.

The consumable may comprise liquid sense electrodes configured to detect changes in capacitance or resistance interfacing on the same electrical substrate as the heater to detect fluid fill state at critical process stages.

The consumable may comprise electrodes interfacing with the same electrical substrate as the heater to detect the presence or flow of fluid via a thermal detection method.

The consumable may comprise areas to carry out the assay processes for DNA amplification, the areas including: a sample loading area, a storage area for pumping elution liquid containing enzyme and reagents, an elution and filtration area, a vessel for thermal or chemical cell lysis, a reaction vessel with accompanying heater and control for DNA amplification, an area for pneumatic or mechanical connection to drive reagents though consumable assay areas, and electrical connections.

A method of using a consumable may comprise pre-filtration and concentration of the sample by manual user load in process, i.e. actuating a syringe of elution buffer past a swab during sample load.

The consumable may comprise micro-fluidic features on chip to after thermal lysis and resuspension stages to trap or remove bubbles from fluidic cells.

A method of using a consumable may comprise lysis of the sample cells in a temperature-controlled reaction vessel in the region of 60 to 90° C. with a preference for 75-80° C.

A method of using a consumable may comprise reverse transcription of target RNA to DNA in a temperature-controlled reaction vessel in the region of 50 to 70° C. with a preference for 60-65° C.

The consumable may comprise serpentine channels to create process areas in the fluidic substrate, e.g. lysis reaction vessel or amplification reaction vessel.

Single wavelength spatially multiplexed fluorescence may be used to detect the presence of amplicons, where the consumable contains multiple spatially separated amplification regions with different primer sequences and the reader contains multiple detectors in register with the consumable amplification regions.

The system may be used to detect the presence of a virus. A viral sample is collected and eluted from a sampling device, filtered to remove as many cells and other large contaminates as possible, and viral media is then lysed to release RNA. Reverse transcription enzyme is mixed with eluted RNA and bubbles are then extracted, and media is moved to detection reaction vessels where reverse transcription occurs and PCR primers and or probes are mixed. Thermocycling occurs here and the presence of target virus is detected.

The system may be used to detect the presence of one or more strains of the Influenza virus, e.g. Flu A and Flu B, as well as the presence of Human Orthopneumovirus, formerly Human respiratory syncytial virus, and a positive control to assess correct operation of the system.

It will be understood that the invention has been described in relation to its preferred embodiments and may be modified in many different ways without departing from the scope of the invention as defined by the accompanying claims.

TABLE 1

Example values for heater power, optimal thermal resistance of heater support layer, and thermal cycle time.

| | | | | | | |
|---|---|---|---|---|---|---|
| Heat sink temperature, $T_{Sink}$ | ° C. | | | 30 | | |
| Lower cycling temperature, $T_{LOW}$ | ° C. | | | 60 | | |
| Higher cycling temperature, $T_{HIGH}$ | ° C. | | | 95 | | |
| Reaction surface area, $A_{cell}$ | $m^2$ | | | 5E−05 | | |
| Reactor heat capacity, h | J/K | | | 0.04 | | |
| Heater power, $p_{heat}$ | W | 47.50 | 15.83 | 4.75 | 1.58 | 0.48 |
| Optimal thermal resistance from heater to heatsink, $R_{T, Opt}$ | K/W | 2 | 6 | 20 | 60 | 200 |
| Thermal resistance × area, $R_{T, Opt} \times A_{cell}$ | $K \cdot m^2/W$ | 1E−04 | 3E−04 | 1E−03 | 3E−03 | 1E−02 |
| Thermal time constant, $h \times R_{T, Opt}$ | s | 0.13 | 0.38 | 0.76 | 1.52 | 5.07 |
| Cooling time, $t_{cool}$ | s | 0.10 | 0.29 | 0.59 | 1.18 | 3.92 |
| Heating time, $t_{heat}$ | s | 0.10 | 0.29 | 0.59 | 1.18 | 3.92 |

TABLE 1-continued

Example values for heater power, optimal thermal resistance of heater support layer, and thermal cycle time.

| | | | | | | |
|---|---|---|---|---|---|---|
| Minimum cycle time, $t_{cycle}$ | s | 0.20 | 0.59 | 1.18 | 2.35 | 7.83 |
| Energy consumed per cycle, $E_{cycle}$ | J | 2.94 | 2.94 | 2.94 | 2.94 | 2.94 |

TABLE 2

Example values for heater power, optimal thermal resistance of heater support layer, and thermal cycle energy consumption and time, showing the preferred design range when a hold step is included in the thermal cycle.

| | | |
|---|---|---|
| Hold time, $t_{HOLD}$ | s | 1 |
| Hold temperature, $T_{HOLD}$ | ° C. | 72 |
| Heat sink temperature, $T_{Sink}$ | ° C. | 30 |
| Lower cycling temperature, $T_{LOW}$ | ° C. | 60 |
| Higher cycling temperature, $T_{HIGH}$ | ° C. | 95 |
| Reaction surface area, $A_{cell}$ | $m^2$ | 5E−05 |
| Reactor heat capacity, h | J/K | 0.04 |

| | | High energy | Preferred design range | | | Long time |
|---|---|---|---|---|---|---|
| Heater power, $p_{heat}$ | W | 47.50 | 15.83 | 4.75 | 1.58 | 0.48 |
| Optimal thermal resistance from heater to heatsink, $R_{T, Opt}$ | K/W | 2 | 6 | 20 | 60 | 200 |
| Thermal resistance × area, $R_{T, Opt} \times A_{cell}$ | $K \cdot m^2/W$ | 1E−04 | 3E−04 | 1E−03 | 3E−03 | 1E−02 |
| Minimum cycle time, $t_{cycle}$ | s | 1.1 | 1.4 | 2.2 | 4.7 | 13.4 |
| Energy consumed during hold step, $E_{HOLD}$ | J | 21.0 | 7.0 | 2.1 | 0.7 | 0.2 |
| Energy consumed per cycle, $E_{cycle}$ | J | 23.9 | 9.9 | 5.0 | 3.6 | 3.1 |

TABLE 3

Nucleic acid amplification test detection methods

| Method | Interfaces with disclosed system | Advantages or disadvantages of method |
|---|---|---|
| Optical detection: Using light to quantitively detect the specific or non-specific amplification product by chemical reporters that are released when binding to nucleic acids. Examples include: Fluorescence, absorbance or colorimetric detection | Optical detection methods require an optical interface between the reaction vessel in the consumable part of the system and the light source and detection in the reader part | Optical probes are widely used in laboratory assays and have been extensively developed for NAAT applications. It requires an additional optical interface between reader and consumable but is a non-contact measurement which reduces interface complexity. |
| Electrical or electrochemical detection: Using the electrical properties of the sample mixture to quantitively detect the specific or non-specific amplification product by electrochemical chemical reporters that are released when binding to nucleic acids or by changes in electrical impedance. Examples include amperometric, impedimetric and dielectric detection. | Electrical or electrochemical detection can be controlled via the existing electrical connection between reader and consumable. However, would require additional electrodes near, for dielectric detection, or in electrical contact with the mixture within the reaction vessel for amperometric and impedimetric detection. | These methods require no additional interface and optical system in reader so there is a clear route to a low-cost robust system. However electrochemical probes are not as widely commercially available as optical probes and may be more prone to inhibition or interference or by sample contaminates. |

TABLE 3-continued

| Nucleic acid amplification test detection methods | | |
|---|---|---|
| Method | Interfaces with disclosed system | Advantages or disadvantages of method |
| Calorimetric detection: Quantitively detecting the amplification product by detecting the thermal energy absorbed or released in the phase transition between single and double stranded DNA. This technique may also be referred to as 'melt curve analysis' in some literature. | Detection of double strand formation via a calorimetric method requires no further interfaces with reaction vessel and instrument as long as reaction vessel sample temperature can be accurately and precisely measured. | Calorimetric detection enables label-free detection of DNA. However, it does require very sensitive temperature sensing and it may be difficult to detect unwanted, non-specific amplification. |

TABLE 4

| Temperature dependencies of example NAAT processes to optimise reaction vessel design | | |
|---|---|---|
| Process | Thermal dependency | Optimal times and temps |
| Lysis: Cells | Thermal lysis operates in a temperature window between breaking open cells by denaturing the cell membrane and nucleic proteins without damaging the released nucleic acids. | Lysis conditions are highly dependent on the species to be lysed, high temperatures of above 70° C. is recommended. Freeze-thaw cycles are often included as part of the lysis process. |
| Lysis: Virus | Thermal lysis operates in a temperature window between breaking open virus by denaturing the viral membrane proteins (capsid) without damaging the released nucleic acids. | |
| Reverse Tran-scription | Reverse transcription requires a balance between improving enzyme activity and minimising damage to the reverse transcription enzyme. | Optimal conditions depend on the reverse transcriptase used, 10 min at 37-50° C. is typically used. The enzyme may be subsequently heated to 95° C. for 5 min for deactivation. |
| Hot Start | Hot Start polymerases are sometimes adopted to minimise non-specific amplifications. Such polymerases must be be activated at high temperatures prior to PCR. | Enzyme activation is typically carried out at 95° C. for 1 min. |
| PCR: 3 Step | Each PCR cycle involves 3 steps: denaturation of the sample DNA into single-stranded DNA at a high temperature, annealing of the primers to the single-stranded DNA at a lower temperature, and extension of the complementary strand to the DNA template at an intermediate temperature. | Optimal conditions depend on the employed assay and enzyme mix. An example set of PCR condition involves denaturation at 95° C. for 30 s, annealing at 60° C. for 30 s and elongation at 72° C. for 1 min/kb sequence length. |
| PCR: 2 Step | The annealing and extension steps can often be combined into one step as a many polymerases are highly active at the annealing temperature. | |
| LAMP or similar enzymatic process | LAMP is an alternative DNA amplification method to PCR. The amplification process is isothermal, where the entire reaction occurs at the same temperature. | Operation temperature is determined by the annealing temperature of the primer set, with a recommended temperature at around 60° C. |

TABLE 4-continued

| Temperature dependencies of example NAAT processes to optimise reaction vessel design | | |
|---|---|---|
| Process | Thermal dependency | Optimal times and temps |
| Melt Curve | A melt curve is measured by ramping the sample temperature while monitoring the presence of double-stranded DNA (e.g. by fluorescent intercalating dye) to determine the temperature at which the sample melts from double-stranded to single-stranded DNA. | Slow temperature ramp from 60° C. to 95° C. |

The invention claimed is:

1. A system for thermal cycling of a test sample in nucleic acid amplification, the system comprising a consumable amplification module and a reader module for receiving the amplification module, (a) wherein the consumable amplification module comprises:

a reactor vessel for containing a test sample;

a heater comprising a heater element in thermal contact with the reactor vessel to heat the test sample;

a temperature sensor for determining a temperature of at least one of the heater element and the test sample; and a heat spreading layer in thermal contact with the heater and adapted to transmit heat from the heater and from the reactor vessel in the amplification module to a heat sink in the reader module; and (b) wherein the reader module comprises:

a heater controller arranged to selectively control the heater element in the amplification module between an on condition and an off condition in response to the determined temperature of the heater element, the test sample, or both the heater element and the test sample;

a thermal interface adapted for thermal contact with the heat spreading layer in the amplification module when the amplification module is inserted into the reader module;

an electrical heater interface arranged to connect the heater controller in the reader module and the heater in the amplification module when the amplification module is inserted into the reader module; and the heat sink in thermal contact with the heater and the heat spreading layer in the consumable amplification module through the thermal interface when the amplification module is inserted into the reader module, for removing heat from the heater and from the reactor vessel to cool the test sample.

2. A system according to claim 1, wherein the thermal interface and the heat sink form a unitary structure.

3. A system according to claim 1, wherein the heat spreading layer has smaller heat capacity than the heat sink.

4. A system according to claim 1, wherein the reader module further comprises a cooler device configured to cool the heat sink.

5. A system according to claim 1, further comprising a heater support arranged in the consumable amplification module between the heater and the heat spreading layer.

6. A system according to claim 5, wherein the heater support has a thermal resistance×area product in the range $1\times10^{-4}$ to $1\times10^{-2}$ $K\cdot m^2/W$.

7. A system according to claim 1, wherein the reader module further comprises an optical system for detecting reactions in the test sample when the amplification module is received by the reader module, wherein the optical system comprises:

an optical interface for connecting the optical system to the amplification module;

a light source for providing light to the test sample; and a photodetector for detecting changes in the transmission, absorption, reflection, or emission, of light by the test sample.

8. A system according to claim 1, wherein the reader module further comprises a pneumatic system for controlling pressure, motion, or both pressure and motion of the test sample when the amplification module is received by the reader module, wherein the pneumatic system comprises:

a pneumatic interface for connecting the pneumatic system to the amplification module;

a pneumatic pump for providing pressure and/or motion to the test sample via the pneumatic interface; and a pneumatic controller for controlling the pneumatic pump.

9. A system according to claim 1, wherein:

the amplification module further comprises a detector for detecting electrochemical changes in the test sample contained in the reactor vessel; and the reader module is adapted to receive a signal from the detector via the electrical heater interface when the amplification module is received by the reader module.

10. A system according to claim 1, wherein the heater element comprises the temperature sensor, and wherein the temperature of the heater element is determinable from an electrical resistance of the heater element.

11. A system according to claim 1, wherein the reader module is adapted to receive a plurality of said amplification modules.

12. A system according to claim 11, wherein the reader module is adapted to perform synchronous, asynchronous, or both synchronous and asynchronous thermal cycling on a plurality of test samples contained by the respective amplification modules.

* * * * *